US011217790B2

(12) United States Patent
Matsumoto et al.

(10) Patent No.: US 11,217,790 B2
(45) Date of Patent: Jan. 4, 2022

(54) POSITIVE ELECTRODE ACTIVE MATERIAL PRECURSOR FOR NONAQUEOUS ELECTROLYTE SECONDARY BATTERY, POSITIVE ELECTRODE ACTIVE MATERIAL FOR NONAQUEOUS ELECTROLYTE SECONDARY BATTERY, METHOD FOR MANUFACTURING POSITIVE ELECTRODE ACTIVE MATERIAL PRECURSOR FOR NONAQUEOUS ELECTROLYTE SECONDARY BATTERY, AND METHOD FOR MANUFACTURING POSITIVE ELECTRODE ACTIVE MATERIAL FOR NONAQUEOUS ELECTROLYTE SECONDARY BATTERY

(71) Applicant: SUMITOMO METAL MINING CO., LTD., Tokyo (JP)

(72) Inventors: Satoshi Matsumoto, Ichikawa (JP); Kazuomi Ryoshi, Niihama (JP); Kikoo Uekusa, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/066,873

(22) PCT Filed: Jan. 5, 2017

(86) PCT No.: PCT/JP2017/000173
§ 371 (c)(1),
(2) Date: Jun. 28, 2018

(87) PCT Pub. No.: WO2017/119459
PCT Pub. Date: Jul. 13, 2017

(65) Prior Publication Data
US 2019/0020025 A1 Jan. 17, 2019

(30) Foreign Application Priority Data

Jan. 6, 2016 (JP) .................................. 2016-001359
Sep. 23, 2016 (JP) ............................. JP2016-186239

(51) Int. Cl.
H01M 4/50 (2010.01)
H01M 4/505 (2010.01)
H01M 4/525 (2010.01)
C01G 51/00 (2006.01)
C01G 53/00 (2006.01)
C01G 53/06 (2006.01)
H01M 4/02 (2006.01)

(52) U.S. Cl.
CPC ............ *H01M 4/525* (2013.01); *C01G 51/50* (2013.01); *C01G 53/006* (2013.01); *C01G 53/06* (2013.01); *C01G 53/50* (2013.01); *H01M 4/505* (2013.01); C01P 2002/52 (2013.01); C01P 2002/54 (2013.01); C01P 2004/03 (2013.01); C01P 2004/32 (2013.01); C01P 2004/50 (2013.01); C01P 2004/51 (2013.01); C01P 2004/61 (2013.01); C01P 2006/11 (2013.01); C01P 2006/12 (2013.01); C01P 2006/40 (2013.01); H01M 2004/021 (2013.01); H01M 2004/028 (2013.01)

(58) Field of Classification Search
CPC .......... H01M 4/36; H01M 4/52; H01M 4/525; H01M 10/0525; H01M 4/505; H01M 4/50; H01B 1/20; H01B 1/22; H01L 51/441; H01L 51/5221
See application file for complete search history.

(56) References Cited

U.S. PATENT DOCUMENTS

| 6,699,618 | B2 * | 3/2004 | Noda ..................... H01M 4/131 429/218.1 |
| 8,592,085 | B2 | 11/2013 | Kobino et al. |
| 2013/0032753 | A1 | 2/2013 | Yamamoto et al. |
| 2013/0065116 | A1 | 3/2013 | Ogihara et al. |

(Continued)

FOREIGN PATENT DOCUMENTS

| JP | 2011-105588 | 6/2011 |
| JP | 2011-181193 | 9/2011 |

(Continued)

OTHER PUBLICATIONS

Journal of The Electrochemical Society, 161 (6) A1023-A1031 (2014).*
Layered lithium transition metal oxide cathodes towards high energy lithium-ion batteries, He et al., J. Mater. Chem., 2012, 22, 3680-3695.*
Yuichi Sato, R&D of Solid Solution Cathode Materials for Lithium Ion Batteries, FB Technical News, No. 66, Jan. 2011, pp. 3-10, with English Abs.

(Continued)

*Primary Examiner* — Haidung D Nguyen
(74) *Attorney, Agent, or Firm* — IPUSA, PLLC

(57) ABSTRACT

A positive electrode active material precursor for a nonaqueous electrolyte secondary battery is provided that includes a nickel-cobalt-manganese carbonate composite represented by general formula $Ni_xCo_yMn_zM_tCO_3$ (where $x+y+z+t=1$, $0.05 \le x \le 0.3$, $0.1 \le y \le 0.4$, $0 \le t \le 0.1$, and M denotes at least one additional element selected from a group consisting of Mg, Ca, Al, Ti, V, Cr, Zr, Nb, Mo, and W) and a hydrogen-containing functional group. The ratio H/Me of the amount of hydrogen H to the amount of metal components Me included in the positive electrode active material precursor is less than 1.60. The positive electrode active material further includes a secondary particle formed by a plurality of primary particles that have been aggregated.

4 Claims, 4 Drawing Sheets

(56) References Cited

U.S. PATENT DOCUMENTS

| | | | |
|---|---|---|---|
| 2014/0087263 A1 | 3/2014 | Matsumoto et al. | |
| 2014/0356717 A1 | 12/2014 | Gunji et al. | |
| 2015/0155548 A1* | 6/2015 | Ryoshi | C01G 53/00 |
| | | | 429/223 |
| 2015/0364761 A1* | 12/2015 | Fukui | H01M 10/0525 |
| | | | 429/223 |
| 2017/0050864 A1 | 2/2017 | Matsumoto et al. | |
| 2018/0331360 A1* | 11/2018 | Meng | H01M 4/485 |

FOREIGN PATENT DOCUMENTS

| | | | |
|---|---|---|---|
| JP | 2011-198759 | 10/2011 | |
| JP | 2011-233300 | 11/2011 | |
| JP | 2012-252964 | 12/2012 | |
| JP | 2013-131415 | 7/2013 | |
| JP | 2013-229339 | 11/2013 | |
| JP | 2016-069209 | 5/2016 | |
| WO | WO-2012169274 A1 * | 12/2012 | H01M 10/0525 |

OTHER PUBLICATIONS

International Search Report dated Apr. 4, 2017 with respect to PCT/JP2017/000173.
Informal Comments submitted on Jul. 12, 2017 for PCT/JP2017/000173.

* cited by examiner

POSITIVE ELECTRODE ACTIVE MATERIAL PRECURSOR FOR NONAQUEOUS ELECTROLYTE SECONDARY BATTERY, POSITIVE ELECTRODE ACTIVE MATERIAL FOR NONAQUEOUS ELECTROLYTE SECONDARY BATTERY, METHOD FOR MANUFACTURING POSITIVE ELECTRODE ACTIVE MATERIAL PRECURSOR FOR NONAQUEOUS ELECTROLYTE SECONDARY BATTERY, AND METHOD FOR MANUFACTURING POSITIVE ELECTRODE ACTIVE MATERIAL FOR NONAQUEOUS ELECTROLYTE SECONDARY BATTERY

TECHNICAL FIELD

The present invention relates to a positive electrode active material precursor for a nonaqueous electrolyte secondary battery, a positive electrode active material for a nonaqueous electrolyte secondary battery, a method for manufacturing a positive electrode active material precursor for a nonaqueous electrolyte secondary battery, and a method for manufacturing a positive electrode active material for a nonaqueous electrolyte secondary battery.

BACKGROUND ART

In recent years, with the widespread use of portable electronic devices, such as mobile phones and notebook computers, there is a high demand for the development of small and light nonaqueous electrolyte secondary batteries having high energy density. There is also a high demand for the development of high-output secondary batteries as large batteries for motor drive power sources.

Lithium ion batteries are secondary batteries that can meet these requirements. A lithium ion secondary battery includes a negative electrode, a positive electrode, an electrolyte solution, and the like. Materials capable of sustaining lithium insertion and deinsertion are used as a negative-electrode active material and a positive-electrode active material.

Lithium ion batteries are currently the subject of substantial research and development. In particular, a lithium ion secondary battery using a layered or spinel type lithium metal composite oxide as a positive-electrode material can achieve a high voltage of around 4V and is therefore being developed for practical applications as a battery having high energy density.

Various lithium composite oxides have been proposed for use as the positive-electrode material of such a lithium ion secondary battery. For example, lithium-cobalt composite oxide ($LiCoO_2$), which is relatively easy to synthesize; lithium-nickel composite oxide ($LiNiO_2$) using nickel as a cheaper alternative to cobalt; lithium-nickel-cobalt-manganese composite oxide ($LiNi_{1/3}CO_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$); lithium-rich nickel-cobalt-manganese composite oxide ($Li_2MnO_3$—$LiNi_xMn_yCo_zO_2$) and the like have been proposed.

Among these positive electrode active materials, lithium-rich nickel-cobalt-manganese composite oxide is attracting attention as a material having high capacity and excellent thermal stability. The lithium-rich nickel-cobalt-manganese composite oxide is a layered compound like lithium-cobalt composite oxide and lithium-nickel composite oxide (e.g., see Non-Patent Literature Document 1).

Methods for manufacturing a precursor for obtaining such lithium-rich nickel-cobalt-manganese composite oxide are disclosed in Patent Document 1 and Patent Document 2, for example.

PRIOR ART DOCUMENTS

Patent Documents

Patent Document 1: Japanese Unexamined Patent Application Publication No. 2011-105588
Patent Document 2: Japanese Unexamined Patent Application Publication No. 2012-252964

NON-PATENT LITERATURE DOCUMENTS

Non-Patent Literature Document 1: "R&D of Solid Solution Cathode Materials for Lithium Ion Batteries", FB TECHNICAL NEWS, No. 66, January 2011, pp. 3-10

SUMMARY OF THE INVENTION

Problem to be Solved by the Invention

As a condition for obtaining a lithium ion secondary battery with good performance (high cycle characteristic, low resistance, high output), a compound composed of particles with a high density (tap density) has to be used as the positive electrode material. That is, by manufacturing a battery using a positive electrode material with a high tap density, a battery with high volume energy density can be obtained.

However, when positive electrode active materials are manufactured using the precursors disclosed in Patent Documents 1 and 2, positive electrode active materials with sufficiently tap densities cannot be obtained.

In view of the above problems of the related art, it is an object of one aspect of the present invention to provide a positive electrode active material precursor for a nonaqueous electrolyte secondary battery that is capable of forming a positive electrode active material for a nonaqueous electrolyte secondary battery with a higher density.

Means for Solving the Problem

According to one embodiment of the present invention, a positive electrode active material precursor for a nonaqueous electrolyte secondary battery is provided that includes a nickel-cobalt-manganese carbonate composite represented by general formula $Ni_xCo_yMn_zM_tCO_3$ (where $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W) and a hydrogen-containing functional group. The ratio H/Me of the amount of hydrogen H to the amount of metal components Me included in the positive electrode active material precursor is less than 1.60. The positive electrode active material precursor further includes a secondary particle formed by a plurality of primary particles that have been aggregated.

Advantageous Effect of the Invention

According to an aspect of the present invention, a positive electrode active material precursor for a nonaqueous electrolyte secondary battery that is capable of forming a positive electrode active material for a nonaqueous electrolyte secondary battery with a higher density can be provided.

EMBODIMENTS FOR IMPLEMENTING THE INVENTION

Figure 1:
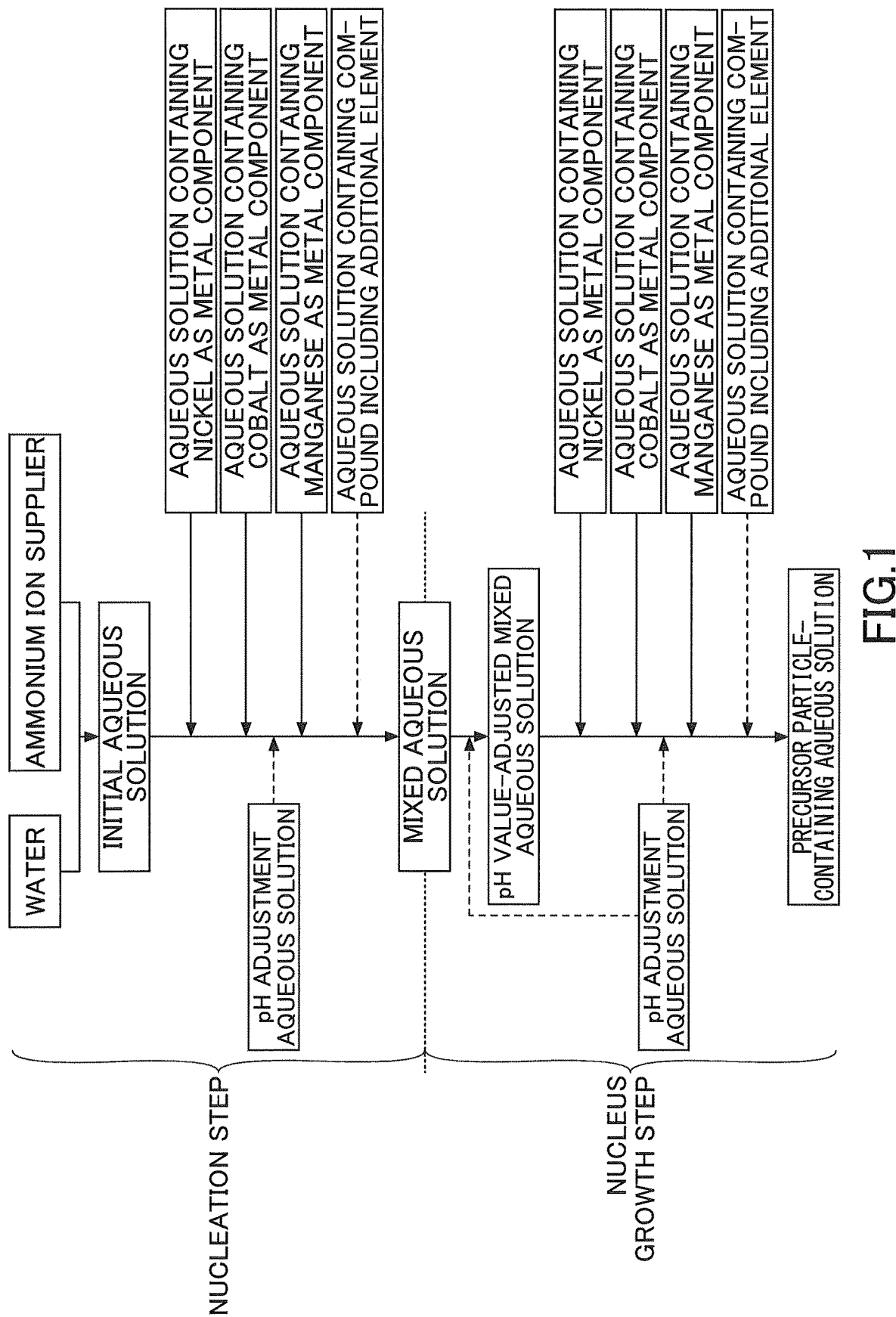
FIG. 1 is a flowchart showing a method for manufacturing a positive electrode active material precursor for a nonaqueous electrolyte secondary battery according to an embodiment of the present invention.

In the following, embodiments of the present invention are described with reference to the accompanying drawings. Note that the present invention is by no way limited to the embodiments described below and various modifications and substitutions may be made with respect to the embodiments described below without departing from the scope of the present invention.

[Positive Electrode Active Material Precursor for Nonaqueous Electrolyte Secondary Battery]

In the following, an example configuration of a positive electrode active material precursor for a nonaqueous electrolyte secondary battery according to an embodiment of the present invention will be described.

The positive electrode active material precursor for a nonaqueous electrolyte secondary battery according to the present embodiment may include a nickel-cobalt-manganese carbonate composite that is represented by the general formula $Ni_xCo_yMn_zM_tCO_3$ (where $x+y+z+t=1$, $0.05 \leq x \leq 0.3$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W), and a hydrogen-containing functional group.

Further, H/Me representing the ratio of the amount of hydrogen H to the amount of metal components Me included in the positive electrode active material precursor may be controlled to be less than 1.60, and the positive electrode active material precursor may include secondary particles formed by a plurality of primary particles that have been aggregated.

As described above, the positive electrode active material precursor for a nonaqueous electrolyte secondary battery according to the present embodiment (hereinafter also simply referred to as "precursor") may include a nickel-cobalt-manganese carbonate composite and a hydrogen-containing functional group. Note that the precursor may consist of the nickel-cobalt-manganese carbonate composite and the hydrogen-containing functional group.

The precursor according to the present embodiment may include substantially spherical secondary particles famed by a plurality of fine primary particles that have been aggregated. The precursor may also consist of such secondary particles.

The precursor according to the present embodiment including the nickel-cobalt-manganese carbonate composite and the hydrogen-containing functional group includes particles with a small particle diameter, high particle size uniformity, and high density (tap density), and as such, the precursor according to the present embodiment may be used as a raw material (i.e., precursor) of a positive-electrode active material for a nonaqueous electrolyte secondary battery.

The precursor according to the present embodiment will be specifically described below.

(1) Composition

As described above, the nickel-cobalt-manganese carbonate composite is a nickel-cobalt-manganese composite in basic carbonate form represented by the general formula $Ni_xCo_yMn_zM_tCO_3$.

In the above general formula, $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W.

When the precursor according to the present embodiment is used as a positive-electrode active material precursor for a nonaqueous electrolyte secondary battery, at least one additional element may be added to the nickel-cobalt-manganese carbonate composite as described above in order to further improve battery characteristics, such as cycle characteristics and output characteristics. The at least one additional element selected from the group consisting of Mg, Ca, Al, Ti, V, Cr, Zr, Nb, Mo, and W may be contained in the nickel-cobalt-manganese carbonate composite at a predetermined atom number ratio t, and is preferably uniformly distributed inside secondary particles and/or uniformly coated on the surfaces of the secondary particles.

Note that when the atom number ratio t of the additional element in the nickel-cobalt-manganese carbonate composite exceeds 0.1, metal elements contributing to oxidation-reduction reactions (redox reactions) may potentially be reduced and the battery capacity may potentially decrease.

Also, even when the nickel-cobalt-manganese carbonate composite does not contain an additional element, the positive-electrode active material manufactured using the precursor according to the present embodiment may have satisfactory battery characteristics, such as cycle characteristics and output characteristics. As such, the nickel-cobalt-manganese carbonate composite does not have to contain an additional element.

Thus, the atom number ratio t of the additional element is preferably adjusted to be $0 \leq t \leq 0.1$.

The additional element M in the above general formula representing the nickel-cobalt-manganese carbonate composite contained in the positive electrode active material precursor for a nonaqueous electrolyte battery according to the present embodiment preferably includes molybdenum (Mo).

By including Mo in the additional element M of the nickel-cobalt-manganese carbonate composite, the initial discharge capacity of a nonaqueous electrolyte secondary battery manufactured using a positive-electrode active material obtained from a positive electrode active material precursor including the nickel-cobalt-manganese carbonate composite may be increased.

Also, the content ratio of Mo in the metal components Ni, Co, Mn, and the additional element M of the nickel-cobalt-manganese carbonate composite is preferably adjusted so that the molybdenum constitutes at least 0.5 at % and no more than 5.0 at % of the metal components.

By adjusting the content ratio of Mo in the metal components of the nickel-cobalt-manganese carbonate composite to be greater than or equal to 0.5 at %, the initial discharge capacity of a nonaqueous electrolyte secondary battery manufactured using a positive electrode active material obtained from a positive electrode active material precursor including the nickel-cobalt-manganese carbonate composite may be particularly increased. Also, by adjusting the content ratio of Mo in the metal components of the nickel-cobalt-manganese carbonate composite to be less than or equal to 5.0 at %, degradation of the sphericity of the nickel-cobalt-manganese carbonate composite may be more reliably prevented.

The additional element is preferably uniformly distributed inside secondary particles included in the precursor (hereinafter also simply referred to as "precursor particles") and/or uniformly coated on the surfaces of the precursor particles.

Note that the state of the additional element in the nickel-cobalt-manganese carbonate composite is not particularly limited. However, preferably, the additional element is uniformly distributed inside and/or uniformly coated on the surface of the nickel-cobalt-manganese carbonate composite as described above. That is, when the precursor according to the present embodiment is used as a positive-electrode active material precursor, battery characteristics can be particularly improved by having the additional element uniformly distributed inside and/or uniformly coated (distributed) on the surface of the nickel-cobalt-manganese carbonate composite.

Note that in order to sufficiently enhance the effect of improving battery characteristics even when the amount of the at least one additional element contained in the nickel-cobalt-manganese carbonate composite is substantially small, the at least one additional element is preferably distributed at a higher concentration on the surface of the carbonate composite as compared with the concentration inside the carbonate composite.

As described above, even when the amount of the at least one additional element contained in the nickel-cobalt-manganese carbonate composite is substantially small, battery characteristics can be improved and a decrease in the battery capacity can be prevented.

Also, the precursor according to the present embodiment may include the hydrogen-containing functional group as described above. Examples of the hydrogen-containing functional group include a hydrogen group, a hydroxyl group, and the like. The hydrogen-containing functional group is mixed into the precursor during the manufacturing process. The precursor according to the present embodiment is preferably adjusted so that H/Me representing the ratio of the amount of hydrogen H to the amount of metal components Me contained in the precursor is less than 1.60. In this way, dense particles may be formed when the precursor is used to manufacture a positive-electrode active material. Note that a value greater than 0 (zero) may be set up as the lower limit of the above ratio H/Me, for example.

Note that the metal components Me contained in the precursor includes Ni, Co, Mn and the additional element M that are represented in the above general formula.

Also, note that while the precursor according to the present embodiment may contain a component other than the nickel-cobalt-manganese carbonate composite and the hydrogen-containing functional group, the precursor according to the present embodiment may also consist of the nickel-cobalt-manganese carbonate composite and the hydrogen-containing functional group. Note that even when the precursor of according to the present embodiment consists of the nickel-cobalt-manganese carbonate composite and the hydrogen-containing functional group, the present embodiment does not exclude the inevitable inclusion of other components during the manufacturing process and the like.

(2) Particle Diameter

The precursor according to the present embodiment may include secondary particles formed by a plurality of primary particles that have been aggregated, and the secondary particles may be arranged to be substantially spherical. The average particle size of the secondary particles is preferably greater than or equal to 2 μm and less than or equal to 10 μm. Particularly, the secondary particles contained in the precursor according to the present embodiment preferably have an average particle diameter that is greater than or equal to 3 μm and less than or equal to 9.5 μm.

Note that the average particle diameter refers to the diameter at a midpoint of a particle size distribution obtained using the laser diffraction/scattering method, where the number of particles for each particle diameter is cumulated starting with larger particles, and the particle diameter at a point where the cumulative volume is 50% of the total volume of all the particles is obtained. Note that the team average particle diameter, as used in the present specification, has the same meaning as described above.

By arranging the average particle diameter of the secondary particles contained in the precursor according to the present embodiment to be greater than or equal to 2 μm and less than or equal to 10 μm, particles contained in a positive electrode active material obtained using the precursor according to the present embodiment as a raw material may be arranged to have a predetermined average particle diameter, for example.

In this way, a nonaqueous electrolyte secondary battery using the positive electrode active material manufactured from the precursor according to the present embodiment may be configured to have a positive electrode with high packing density, larger battery capacity, and improved output characteristics, for example. Because the average particle diameter of the secondary particles contained in the precursor according to the present embodiment is correlated with the particle diameter of the particles contained in the positive electrode active material obtained from the precursor as described above, the average particle diameter of the secondary particles contained in the precursor is closely related to the characteristics of a battery using the positive electrode active material as a positive electrode material.

When the average particle diameter of the secondary particles contained in the precursor is less than 2 μm, the average particle diameter of the particles contained in the positive electrode active material obtained from the precursor is also reduced, and as a result, the packing density of the positive electrode may be reduced, and the battery capacity per volume may be reduced.

On the other hand, when the average particle diameter of the secondary particles contained in the precursor is greater than 10 μm, the specific surface area of the obtained positive electrode active material decreases and the interface with the electrolyte decreases, so that the resistance of the positive electrode may increase and the output characteristics of the battery may deteriorate.

Thus, the average particle diameter of the secondary particles contained in the precursor according to the present embodiment is preferably greater than or equal to 2 μm and less than or equal to 10 μm.

(3) Particle Size Distribution

The particle size distribution of the secondary particle contained in the precursor according to the present embodiment is preferably configured such that an index [$(d_{90}-d_{10})$/average particle diameter] indicating the particle size distribution range is less than or equal to 0.55, and more preferably less than or equal to 0.53.

Note that $d_{90}$ and $d_{10}$ respectively represent the diameters at points where the cumulative volume is 90% and 10% of the total volume of all particles in the particle size distribution obtained using the laser diffraction/scattering method when the number of particles for each particle diameter is cumulated starting with smaller particles. Note that $d_{90}$ and $d_{10}$ as used in the present specification have the same meaning as described above.

The particle size distribution of the positive electrode active material manufactured using the precursor according to the present embodiment is strongly influenced by the particle size distribution of the precursor, which corresponds to the raw material of the positive electrode active material. As such, when fine particles and/or coarse particles (large particle) are mixed in the precursor, similar sized particles will also be present in the positive electrode active material.

That is, when the precursor according to the present embodiment has a wide particle size distribution range with the index [$(d_{90}-d_{10})$/average particle diameter] exceeding 0.55, the positive electrode active material manufactured using the precursor may also contain fine particles and/or coarse particles.

On the other hand, by controlling the index [$(d_{90}-d_{10})$/average particle diameter] of the precursor to be less than or equal to 0.55, the positive electrode active material obtained using the precursor may also have a narrow particle size distribution range and more uniform particle diameters.

Note that when a positive electrode is famed using a positive electrode active material containing a large amount of fine particles, heat may be generated as a result of local reaction of the fine particles and the safety of the battery may be compromised. Also, selective deterioration of the fine particles may occur to thereby cause degradation of cycle characteristics of the battery.

When a positive electrode is formed using a positive electrode active material containing a large amount of coarse particles, a sufficient reaction area for a reaction between the electrolyte and the positive electrode active material may not obtained and the battery output may decrease due to an increase in reaction resistance.

The precursor according to the present embodiment as described above contains substantially spherical secondary particles formed by the aggregation of fine primary particles. The precursor according to the present embodiment can be configured to have secondary particles with a small particle diameter, high particle size uniformity, and high density (tap density).

As such, the precursor according to the present embodiment may be particularly suitable as a raw material of a positive electrode active material for nonaqueous electrolyte secondary battery, and may enable the manufacture of a nonaqueous electrolyte secondary battery with excellent safety, miniaturized size, and high power output.

[Method for Manufacturing Positive-Electrode Active Material Precursor for Nonaqueous Electrolyte Secondary Battery]

In the following, an example method for manufacturing a positive electrode active material precursor for a nonaqueous electrolyte secondary battery (hereinafter also simply referred to as "precursor manufacturing method") according to an embodiment of the present invention will be described.

Note that the precursor manufacturing method according to the present embodiment may be implemented to manufacture the above-described precursor, and as such, aspects of the precursor manufacturing method according to the present embodiment that have already been described above in connection with the precursor may be omitted in the description below.

In the precursor manufacturing method according to the present embodiment, a precursor can be obtained by a crystallization reaction, and the obtained precursor can be washed and dried as necessary.

Specifically, the precursor manufacturing method according to the present embodiment is a method for manufacturing a positive electrode active material precursor for a nonaqueous electrolyte secondary battery that includes a nickel-cobalt-manganese carbonate composite represented by general formula $Ni_xCo_yMn_zM_tCO_3$ (where $x+y+z+t=1$, $0.05 \leq x \leq 0.3$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W) and a hydrogen-containing functional group. The precursor manufacturing method may include the following steps.

A nucleation step of forming nuclei in a mixed aqueous solution that is prepared by mixing together, under the presence of carbonate ions, an initial aqueous solution containing an ammonium ion supplier, an aqueous solution containing nickel as a metal component, an aqueous solution containing cobalt as a metal component, and an aqueous solution containing manganese as a metal component.

A nucleus growth step of growing the nuclei formed in the nucleation step.

In the nucleation step, the pH value of the mixed aqueous solution may be controlled to be less than or equal to 7.5 at a reaction temperature of 40° C. as the standard temperature.

An example flow of the precursor manufacturing method according to the present embodiment as illustrated in FIG. 1 will be described below. As shown in FIG. 1, the precursor manufacturing method according to the present embodiment includes: (A) a nucleation step; and (B) a nucleus growth step of growing the particles of the precursor using the coprecipitation method after performing the nucleation step.

In the continuous crystallization method, which is conventionally used, nucleation reaction and nucleus growth reaction proceed simultaneously in the same reaction tank, and as such, the obtained compound particles have a wide particle size distribution.

In contrast, the precursor manufacturing method according to the present embodiment clearly separates the time during which nucleation reaction mainly occurs (nucleation step) and the time during which nucleus growth reaction mainly occurs (nucleus growth step). In this way, precursor particles having a narrow particle size distribution may be obtained even if both steps are performed in the same reaction tank. Note that the precursor manufacturing step according to the present embodiment may further include a nuclear disintegration step that is performed between the above two steps, the nuclear disintegration step involving stopping the addition of raw materials and only performing stirring.

In the following, each step of the precursor manufacturing method according to the present embodiment will be described in detail.

(1) Nucleation Step

The nucleation step will be described with reference to FIG. 1.

As shown in FIG. 1, in the nucleation step, first, ion exchange water (water) and an ammonium ion supplier may be mixed together in a reaction tank to prepare an initial aqueous solution. Note that an acidic substance such as sulfate may be added to the initial aqueous solution as necessary to adjust the pH of the initial aqueous solution to be less than or equal to 7.5. In particular, the pH of the initial aqueous solution is preferably adjusted to be less than or equal to 6.5.

The ammonium ion supplier is not particularly limited but is preferably at least one substance selected from a group consisting of ammonium carbonate aqueous solution, ammonia water, ammonium chloride aqueous solution, and ammonium sulfate aqueous solution.

Also, in this step, an inert gas such as nitrogen gas is preferably blown into the reaction tank in order to prevent oxygen from entering the reaction tank. In other words, the interior of the reaction tank is preferably arranged to have an inert gas atmosphere, such as a nitrogen gas atmosphere, for example. As described below, the interior of the reaction tank is preferably arranged to have an inert gas atmosphere in the nucleus growth step as well. As such, the interior of the reaction tank may be arranged to have an inert gas atmosphere throughout the execution of the nucleation step and the nucleus growth step.

However, in the case where carbon dioxide gas is used as a carbonate ion source as described below, carbon dioxide may supplied to the atmosphere within the reaction tank in addition to the inert gas or in place of the inert gas.

By performing the nucleation step and the nucleus growth step in an atmosphere containing an inert gas and/or carbon dioxide gas, the ratio H/Me of the amount of hydrogen H to the amount of metal components Me contained and the content of metal component Me contained in the precursor may be controlled to be less than 1.60, and the above-described precursor including secondary particles formed by the aggregation of a plurality of primary particles can be obtained.

In the nucleation step, an aqueous solution containing nickel as a metal component, an aqueous solution containing cobalt as a metal component, and an aqueous solution containing manganese as a metal component may be added and mixed into the initial aqueous solution in the reaction tank to form a mixed aqueous solution.

Note that when adding the aqueous solution containing nickel as a metal component and the like to the initial aqueous solution during the nucleation step, the pH value of the mixed aqueous solution to be obtained is preferably controlled to be less than or equal to 7.5 at a reaction temperature of 40° C. as the standard temperature. More preferably, the pH value of the mixed aqueous solution is controlled to be less than or equal to 6.5. In this respect, the aqueous solution containing nickel as a metal component and the like may be gradually added dropwise to the initial aqueous solution instead of being added at once.

The lower limit of the pH value of the mixed aqueous solution during the nucleation step is not particularly limited, but for example, the pH value may preferably be greater than or equal to 3.0, and more preferably greater than or equal to 5.0.

In the nucleation step, the pH value of the mixed aqueous solution that is obtained by adding aqueous solutions containing metal components (e.g., aqueous solution containing nickel as a metal component) to the initial aqueous solution is preferably maintained at a lower pH value than that during the nucleus growth step (described below). By maintaining the pH value of the mixed aqueous solution at a lower value in the nucleation step, nuclei in the mixed aqueous solution can be reduced in size and increased in number so that the particle diameter of the secondary particles contained in the obtained precursor can be reduced.

Also, in order to control the pH value of the mixed aqueous solution, when dropping the aqueous solutions containing metal components such as the aqueous solution containing nickel, a pH adjustment aqueous solution may also be dropped into the initial aqueous solution along with the aqueous solutions containing metal components. The pH adjustment aqueous solution to be used is not particularly limited, but for example, an aqueous solution containing an alkaline substance and/or an ammonium ion supplier may be used. Note that the ammonium ion supplier is not particularly limited, but the same substance as that used in the initial aqueous solution can be used, for example. Also, the alkaline substance is not particularly limited, but for example, at least one substance selected from a group consisting of sodium carbonate, sodium hydrogen carbonate, potassium carbonate, sodium hydroxide, and potassium hydroxide may preferably be used.

In particular, the pH adjustment aqueous solution preferably contains a carbonate salt, and in such case, the initial aqueous solution and the aqueous solution containing nickel as a metal component and the like can be mixed together under the presence of carbonate ions without having to separately supply carbonate ions. The method of supplying the pH adjustment aqueous solution into the reaction tank is not particularly limited, but for example, the pH adjustment aqueous solution may be supplied using a pump that is capable of flow rate control, such as a metering pump, while sufficiently stirring the mixed aqueous solution, so that the pH value of the mixed aqueous solution may be maintained within a predetermined range.

In the mixed aqueous solution obtained by adding the aqueous solution containing nickel as a metal component and the like to the initial aqueous solution, particles corresponding to nuclei of the precursor may be formed. Note that whether a predetermined amount of nuclei has been formed in the mixed aqueous solution can be determined based on the amount of the metal salt contained in the mixed aqueous solution.

In the following, the aqueous solution containing nickel as a metal component, the aqueous solution containing cobalt as a metal component, and the aqueous solution containing manganese as a metal component that are added to the initial aqueous solution in the nucleation step will be described.

The aqueous solution containing nickel as a metal component, the aqueous solution containing cobalt as a metal component, and the aqueous solution containing manganese as a metal component may each contain a metal compound including the corresponding metal component. That is, for example, the aqueous solution containing cobalt as a metal component may contain a metal compound including cobalt.

As the metal compound, a water-soluble metal compound is preferably used, and examples of the water-soluble metal compound include nitrates, sulfates, hydrochlorides, and the like. Specifically, for example, nickel sulfate, cobalt sulfate, manganese sulfate or the like can be suitably used.

The aqueous solution containing nickel as a metal component, the aqueous solution containing cobalt as a metal component, and the aqueous solution containing manganese as a metal component may be mixed together, in part or entirely, to form a metal component-containing mixed aqueous solution, and the resulting metal component-containing mixed aqueous solution may be added to the initial aqueous solution.

The composition ratios of the respective metals in the obtained precursor will be the same as the composition ratios of the respective metals in the metal component-containing mixed aqueous solution. As such, for example, the metal component-containing mixed aqueous solution is preferably prepared by adjusting the ratios of the respective metal compounds to be dissolved in the aqueous solution so that the composition ratios of the respective metals contained in the metal component-containing mixed aqueous solution to be added to the initial aqueous solution in the nucleation step can be controlled to be equal to the composition ratios of the respective metals in the precursor to be produced.

Note that in the case where certain metal compounds may react with each other to produce an unnecessary compound when a plurality of metal compounds are mixed together, the aqueous solutions containing the respective metal components may be simultaneously added to the initial aqueous solution at predetermined ratios.

When the aqueous solutions containing the respective metal components are not mixed together and are separately added to the initial aqueous solution, the aqueous solutions containing the respective metal components are preferably prepared so that the composition ratios of the respective metals in the entire aqueous solution containing the respective metal components to be added may be equal to the target composition ratios of the respective metals in the precursor to be produced.

As described above, the precursor to be manufactured by the precursor manufacturing method according to the present embodiment may include a nickel-cobalt-manganese carbonate composite represented by general formula $Ni_xCo_yMn_zM_tCO_3$ (where $x+y+z+t=1$, $0.05 \leq x \leq 0.3$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W) and a hydrogen-containing functional group.

That is, the precursor may further include an additional element other than nickel, cobalt, and manganese.

As such, in the nucleation step, an aqueous solution (hereinafter also simply referred to as "additional-element-containing aqueous solution") containing at least one additional element selected from the group consisting of Mg, Ca, Al, Ti, V, Cr, Zr, Nb, Mo, and W (hereinafter also simply referred to as "additional element") may also be added to the initial aqueous solution. As described above, the additional element preferably contains Mo, and as such, an aqueous solution containing at least molybdenum as a metal component is preferably used as the aqueous-solution-containing aqueous solution.

Note that in the case where aqueous solutions containing metal compounds, such as the aqueous solution containing nickel as the metal component and the like, are mixed together to prepare a metal component-containing mixed aqueous solution to be added to the initial aqueous solution, the additional-element-containing aqueous solution may also be added to and mixed with the metal component-containing mixed aqueous solution.

Also, in the case where aqueous solutions containing metal compounds, such as the aqueous solution containing nickel and the like, are not mixed together but are separately added to the initial aqueous solution, the additional-element-containing aqueous solution may also be separately added to the initial aqueous solution along with the aqueous solutions containing metal components.

The additional-element-containing aqueous solution may be prepared using, for example, a compound containing the additional element. Examples of the compound containing the additional element include titanium sulfate, ammonium peroxotitanate, potassium titanium oxalate, vanadium sulfate, ammonium vanadate, chromium sulfate, potassium chromate, zirconium sulfate, zirconium nitrate, niobium oxalate, ammonium molybdenum acid, sodium tungstate, ammonium tungstate, and the like. The compound to be added can be selected according to the additional element to be added.

As described above, the additional element is preferably uniformly distributed inside the secondary particles contained in the precursor (hereinafter also simply referred to as "precursor particles") and/or uniformly coated on the surfaces of the precursor particles.

By adding the above-described additional-element-containing aqueous solution to the mixed aqueous solution, the additional element can be uniformly dispersed within the precursor particles.

Further, in order to uniformly coat the additional element on the surfaces of the secondary particles of the precursor, for example, a coating step of coating the surfaces with the additional element may be performed after completion of the nucleus growth step (described below). The coating step will be described below in connection with the nucleus growth step.

In the nucleation step, an aqueous solution containing nickel as a metal component and the like may be added to and mixed with an initial aqueous solution under the presence of carbonate ions to form a mixed aqueous solution so that nuclei may be formed in the mixed aqueous solution. Note that the method of supplying carbonate ions in the above step is not particularly limited, but for example, the carbonate ions may be supplied to the mixed aqueous solution by supplying carbon dioxide into the reaction tank together with an inert gas as described below. The carbonate ions may also be supplied using a carbonate salt when preparing the initial aqueous solution or the pH adjustment aqueous solution, for example.

As described above, in the nucleation step, an aqueous solution containing nickel as a metal component and the like may be added to and mixed with an initial aqueous solution under the presence of carbonate ions to form a mixed aqueous solution so that nuclei may be formed in the mixed aqueous solution.

In this case, the concentration of metal compounds in the mixed aqueous solution is preferably greater than or equal to 1 mol/L and less than or equal to 2.6 mol/L, and more preferably greater than or equal to 1.5 mol/L and less than or equal to 2.2 mol/L.

This is because when the concentration of the metal compounds in the mixed aqueous solution is less than 1 mol/L, the amount of crystallization per reaction tank is reduced and productivity may be decreased as a result. On the other hand, when the concentration of the metal compounds in the mixed aqueous solution exceeds 2.6 mol/L, the concentration of the metal compounds may exceed the saturation concentration at ordinary temperature such that crystals may be reprecipitated and clog the piping of equipment, for example.

Note that the concentration of the metal compounds refers to the concentration of the metal compounds derived from the aqueous solutions added to the mixed aqueous solution, including the aqueous solution containing nickel as a metal component, the aqueous solution containing cobalt as a metal component, the aqueous solution containing manganese as a metal component, and, in some cases, the additional-element-containing aqueous solution.

Also, in the nucleation step, although the ammonium ion concentration in the initial aqueous solution and/or the mixed aqueous solution is not particularly limited, for example, the ammonium ion concentration is preferably be controlled to be greater than or equal to 0 g/L and less than or equal to 20 g/L, and is more preferably controlled to be a constant value.

Note that the pH value and the ammonium ion concentration in the mixed aqueous solution and the like may respectively be measured using a general pH meter and an ion meter, for example.

In the nucleation step, the temperature of the mixed aqueous solution is preferably maintained to be greater than or equal to 25° C., and or more preferably greater than or equal to 30° C.

Note that although the upper limit for the temperature of the mixed aqueous solution in the nucleation step is not particularly limited, for example, the temperature of the mixed aqueous solution may be controlled to be less than or equal to 45° C.

When the temperature of the mixed aqueous solution in the nucleation step is less than 25° C., nucleation may easily occur due to low solubility of the mixed aqueous solution such that controllability may be compromised.

On the other hand, when the temperature of the mixed aqueous solution in the nucleation step exceeds 45° C., distortion may occur in primary crystals and an adequately high tap density may not be obtained in the positive electrode active material to be manufactured.

In the nucleation step, the concentration of the crystallization product at the time a coprecipitation reaction is completed is preferably arranged to be within a range of approximately 30 g/L to 200 g/L, and more preferably, the concentration of the crystallization product is arranged to be greater than or equal to 80 g/L and less than or equal to 150 g/L. Note that the metal component-containing mixed aqueous solution and the like are preferably supplied to the initial aqueous solution so that the concentration of the crystallization product falls within the above range.

This is because when the concentration of the crystallization product is greater than or equal to 30 g/L, aggregation of primary particles in the precursor particles can be sufficiently promoted.

However, when the concentration of the crystallization product exceeds 200 g/L, diffusion of the added metal component-containing mixed aqueous solution in the reaction tank may insufficient and deviations may occur in the growth of the precursor particles.

After completing the nucleation step, i.e., after adding the metal component-containing mixed aqueous solution and the like to the initial aqueous solution, stirring of the mixed aqueous solution is continued and a process of disintegrating the generated nuclei may be performed (nucleus disintegration step). The nucleus disintegration step is preferably performed for at least 1 minute, and more preferably for at least 3 minutes. Note that when the nucleus disintegration step is omitted, undesired effects, such as aggregation of the generated nuclei, enlargement of the particle diameter, and density decrease of the particles may occur.

(2) Nucleus Growth Step

In the following, the nucleus growth step will be described with reference to FIG. 1.

In the nucleus growth step, nuclei generated in the nucleation step can be grown.

Specifically, for example, as shown in FIG. 1, in the nucleus growth step, the pH value of the mixed aqueous solution obtained in the nucleation step can be adjusted to be greater than or, equal to 5.5 and less than or equal to 8.0 at a reaction temperature of 40° C. as the standard temperature. The pH value of the mixed aqueous solution is more preferably adjusted to be greater than or equal to 6.4 and less than or equal to 7.4, and more preferably greater than or equal to 6.6 and less than or equal to 7.4. The pH value of the mixed aqueous solution can be adjusted by adding a pH adjustment solution as described below, for example.

The nucleus growth step may include a step of adding and mixing an aqueous solution containing nickel as a metal component, an aqueous solution containing cobalt as a metal component, and an aqueous solution containing manganese as a metal component into the mixed aqueous solution obtained after the nucleation step, under the presence of carbonate ions.

Note that the mixed aqueous solution obtained after the nucleation step is preferably a pH value-adjusted mixed aqueous solution that has undergone pH adjustment after the nucleation step as described above.

Also, the aqueous solution containing nickel as a metal component, the aqueous solution containing cobalt as a metal component, and the aqueous solution containing manganese as a metal component may be mixed together, in part or entirely, in the same manner as in the nucleation step, to form a metal component-containing mixed aqueous solution, and the resulting metal component-containing mixed aqueous solution may be added to the mixed aqueous solution. In the case where certain metal compounds may react with each other to produce an unnecessary compound when a plurality of metal compounds are mixed together, the aqueous solutions containing the respective metal components may be separately added to the mixed aqueous solution.

The aqueous solution containing nickel as a metal component, the aqueous solution containing cobalt as a metal component, and the aqueous solution containing manganese as a metal component that are used in the nucleus growth step may be the same aqueous solutions as those used in the nucleation step. Also, concentration adjustment and the like may be separately performed on the aqueous solutions containing the respective metal components, for example.

Further, when adding the aqueous solution containing nickel as a metal component and the like to the mixed aqueous solution, an additional element-containing aqueous solution may also be added along with the aqueous solutions containing metal components as in the nucleation step. Also, the additional element-containing aqueous solution may be added to and mixed with the metal component-containing mixed aqueous solution as described above. Also, in the case where the aqueous solutions containing the respective metal components are separately added to the mixed aqueous solution, the additional element-containing aqueous solution may also be separately added to the mixed aqueous solution.

When adding the aqueous solution containing nickel as a metal component and the like to the mixed aqueous solution, the pH value of the obtained mixed aqueous solution is preferably controlled to be within a predetermined range as described below. In this respect, the aqueous solution containing nickel as a metal component and the like may be gradually added dropwise into the mixed aqueous solution rather than being added at once. In this way, the aqueous solutions containing the metal components or the metal component-containing mixed aqueous solution may be supplied to the reaction tank at a constant flow rate.

In the case of supplying the aqueous solutions containing metal components or the metal component-containing mixed aqueous solution as described above, a pH adjustment aqueous solution is preferably added along with the aqueous solutions containing metal components in order to maintain the pH value of the mixed aqueous solution within a predetermined range. The pH adjustment aqueous solution used in the nucleus growth step may be the same as the pH adjustment aqueous solution used in the nucleation step. Note that concentration adjustment and the like may be separately performed on the pH adjustment aqueous solution, for example.

Also, in the nucleus growth step, an aqueous solution containing a metal component, such as an aqueous solution containing nickel and the like, may be added to the mixed aqueous solution, under the presence of carbonate ions. Note that the method of supplying carbon ions in this step is not particularly limited, but for example, the carbonate ions may be supplied to the mixed aqueous solution by supplying carbon dioxide gas to the reaction tank. Also, for example, the carbonate ions may be supplied by using a carbonate salt to prepare the above-described pH adjustment aqueous solution. Note that the carbonate ions are preferably supplied by using a carbonate salt to prepare the pH adjustment aqueous solution. In this way, the carbonate ions may be directly supplied to the mixed aqueous solution.

In the nucleus growth step, the pH value of the mixed aqueous solution is preferably greater than or equal to 5.5 and less than or equal to 8.0 at a reaction temperature of 40° C. as the standard temperature. The pH value of the mixed aqueous solution is more preferably greater than or equal to 6.4 and less than or equal to 7.4, and more preferably greater than or equal to 6.6 and less than or equal to 7.4. As such, the pH value of the mixed aqueous solution is preferably controlled to be within the above range during the nucleus growth step.

When the pH value of the mixed aqueous solution exceeds 8.0 in the nucleus growth step, cation impurities are more likely to remain in the mixed aqueous solution.

Also, when the pH value of the mixed aqueous solution is less than 5.5 in the nucleus growth step, anion impurities are more likely to remain in the mixed aqueous solution. Note that the pH value of the mixed aqueous solution may be controlled by adjusting the amount of initial aqueous solution that is added, for example.

By controlling the pH value of the mixed aqueous solution to be within the above range in the nucleus growth step, a precursor with a small amount of residual impurities may be obtained. Also, by controlling the pH value of the mixed aqueous solution to be within the above range in the nucleus growth step to reduce fluctuations, the growth of the precursor particles may be stabilized and precursor particles with a narrow particle size distribution range may be obtained.

In the nucleus growth step, an inert gas such as nitrogen gas is preferably blown into the reaction tank in order to prevent oxygen from entering the reaction tank. In other words, the interior of the reaction tank is preferably arranged to have an inert gas atmosphere, such as a nitrogen gas atmosphere, for example. Note that in the case where carbon dioxide gas is used as a carbonate ion source, carbon dioxide may supplied to the atmosphere within the reaction tank in addition to the inert gas or in place of the inert gas.

By blowing an inert gas into the reaction tank to prevent oxygen in the air from entering the reaction tank to cause oxidization, a precursor of high purity may be obtained. Also, fine crystals may be aggregated to form large secondary particles.

In the nucleus growth step, the ammonium ion concentration in the mixed aqueous solution is preferably greater than or equal to 0 g/L and less than or equal to 20 g/L, and more preferably, the ammonium ion concentration is maintained at a constant value.

By controlling the ammonium ion concentration to be less than or equal to 20 g/L, nuclei of precursor particles may be homogenously grown. Also, by maintaining the ammonium ion concentration at a constant value in the nucleus growth step, solubility of metal ions may be stabilized and uniform nuclei growth of precursor particles may be promoted.

Note that the lower limit of the ammonium ion concentration is not particularly limited and may be suitably adjusted as necessary. Thus, the ammonium ion concentration in the mixed aqueous solution is preferably adjusted to be greater than or equal to 0 g/L and less than or equal to 20 g/L by adjusting the amount of ammonium supplier supplied when preparing the initial aqueous solution, for example.

The particle diameter of the precursor may be controlled by adjusting the metal component-containing mixed aqueous or the reaction time of the nucleus growth step, for example.

That is, in the nucleus growth step, reaction may be continued until the precursor particle are grown to a desired particle diameter, and in this way, precursor particles having the desired particle diameter may be obtained.

Also, as described above, the precursor manufacturing method according to the present embodiment may further include a coating step of coating the additional element on the precursor particles obtained in the nucleus growth step.

The coating step may be implemented by one of the following process steps, for example.

For example, the coating step may be a process step that involves adding the additional element-containing aqueous solution to a slurry containing suspended precursor particles, and precipitating the additional element on the surfaces of the precursor particles by a crystallization reaction.

In preparing the slurry containing the suspended precursor particles, the precursor particles are preferably turned into a slurry using the additional element-containing aqueous solution. Also, when adding the additional element-containing aqueous solution to the slurry containing the suspended precursor particles, the pH value of a mixed aqueous solution obtained by mixing together the slurry and the additional element-containing aqueous solution is preferably controlled to be greater than or equal to 5.5 and less than or equal to 8.0.

Also, the coating step may be a process step that involves spraying the additional element-containing aqueous solution or a slurry onto the precursor particles and drying the precursor particles, for example.

The coating step may also be a process step that involves spray drying a slurry containing suspensions of the precursor particles and a compound containing the additional element.

The coating step may also be a process step that involves mixing together the precursor particles and a compound containing the additional element by a solid phase method, for example.

Note that the additional element-containing aqueous solution used in the coating step may be the same as the additional element-containing aqueous solution used in the nucleation step. Also, in the coating step, an alkoxide solution containing the additional element may be used instead of the additional element-containing aqueous solution, for example.

In the case where the additional element-containing aqueous solution is added to the initial aqueous solution and/or the mixed aqueous solution in the nucleation step and/or the nucleus growth step as described above, and the coating step is performed to coat the surfaces of the precursor particles with the additional element, the amount of additional element ions to be added to the initial aqueous solution and/or the mixed aqueous solution in the nucleation step and/or the nucleus growth step is preferably reduced by the amount of additional element to be coated on the precursor particles. By reducing the amount of the additional element-containing aqueous solution to be added to the mixed aqueous solution by the amount of the additional element to be coated on the precursor particles, the atom number ratio of the additional element contained in the precursor with respect to the other metal components contained in the precursor can be controlled to a desired value.

Note that the coating step of coating the surfaces of the precursor particles with the additional element as described above may be performed on the precursor particles that have been heated after completion of the nucleus growth step.

The precursor manufacturing method according to the present embodiment is preferably implemented by an apparatus that does not collect the precursor corresponding to the reaction product until reactions from the nucleation step to the nucleus growth step are completed. An example of such an apparatus includes a commonly used batch reaction tank equipped with a stirrer and the like. By using such an apparatus, problems associated with growing particles being collected along with overflow fluid (problems encountered in conventional continuous crystallization apparatuses that collect products using overflow fluid) may be avoided, and in this way, particles having a narrow particle size distribution and a uniform particle diameter can be obtained.

Also, an apparatus that is capable of controlling the atmosphere, such as a sealed apparatus, is preferably used so that the atmosphere of the reaction tank can be controlled.

By using an apparatus that is capable of controlling the atmosphere of the reaction tank, particles contained in the precursor may be controlled to have the configurations as described above and a substantially uniform coprecipitation reaction may be promoted. In this way, particles having a desirable particle size distribution, i.e., particles having a narrow particle size distribution, can be obtained.

In the nucleus growth step, the pH value of the mixed aqueous solution obtained in the nucleation step may be adjusted to be within a predetermined range, and an inert gas may be blown into the reaction tank, for example, to obtain uniform precursor particles.

By performing the above nucleus growth step, a precursor particle-containing aqueous solution corresponding to a slurry containing precursor particles may be obtained. After the nucleus growth step is completed, a washing step and a drying step may be performed.

(3) Washing Step

In the washing step, the slurry containing the precursor particles obtained in the nucleus growth step described above can be washed.

In the washing step, a slurry containing precursor particles is filtered, washed with water, and filtered again.

The filtration may be performed by a conventional technique using a centrifuge or a suction filtering machine, for example.

Also, the washing with water may be performed by a conventional method that can remove excess raw materials and the like contained in the precursor particles.

The water used in the washing step is preferably water containing a minimum amount of impurities in order to prevent impurity contamination, and more preferably, purified water is used.

(4) Drying Step

In the drying step, the precursor particles washed in the washing step can be dried.

For example, in the drying step, the precursor particles that have been washed may be dried at a drying temperature that is greater than or equal to 100° C. and less than or equal to 230° C.

After completing the drying step, a precursor can be obtained.

In the precursor manufacturing method according to the present embodiment, a precursor that is capable forming a positive-electrode active material for a nonaqueous electrolyte secondary battery containing dense particles can be obtained.

Also, in the precursor manufacturing method according to the present embodiment, the time during which nucleation reaction mainly occurs (nucleation step) and the time during which nucleus growth reaction mainly occurs (nucleus growth step) are clearly separated such that precursor particles (secondary particles) having a narrow particle size distribution may be obtained even if both steps are carried out in the same reaction tank.

Also, in the precursor manufacturing method according to the present embodiment, the crystal size of the precursor particles obtained during the crystallization reaction can be controlled.

Thus, in the precursor manufacturing method according to the present embodiment, a precursor with primary particles having small particle diameters and secondary particles having particle diameter uniformity and high density (tap density) can be obtained.

Also, in the precursor manufacturing method according to the present embodiment, the nucleation step and the nucleus growth step can be separately performed in one reaction tank by simply adjusting the pH value of the reaction solution. As such, the precursor manufacturing method according to the present embodiment may have substantial industrial value in that it can be easily implemented and is suitable for large-scale production.

[Positive-Electrode Active Material for Nonaqueous Electrolyte Secondary Battery]

In the following, an example configuration of a positive electrode active material for a nonaqueous electrolyte secondary battery (hereinafter also simply referred to as "positive-electrode active material") according to an embodiment of the present invention will be described.

The positive electrode active material according to the present embodiment corresponds to a positive electrode active material for a nonaqueous electrolyte secondary battery including a lithium metal composite oxide.

The lithium metal composite oxide may be represented by general formula $Li_{1+\alpha}Ni_xCo_yMn_zM_tO_2$ (where $0.25 \leq \alpha \leq 0.55$, $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W)

The additional element M in the above general formula representing the lithium metal composite oxide contained in the positive electrode active material for a nonaqueous electrolyte battery according to the present embodiment preferably includes molybdenum (Mo).

By including Mo in the additional element M of the lithium metal composite oxide, the initial discharge capacity of a nonaqueous electrolyte secondary battery manufactured using a positive-electrode active material including the lithium metal composite oxide may be increased.

Also, the content ratio of Mo in the metal components Ni, Co, Mn, and the additional element M of the lithium metal composite oxide is preferably adjusted so that the molybdenum constitutes at least 0.5 at % and no more than 5.0 at % of the metal components.

By adjusting the content ratio of Mo in the metal components other than lithium (Li) of the lithium metal composite oxide to be greater than or equal to 0.5 at %, the initial discharge capacity of a nonaqueous electrolyte secondary battery manufactured using the positive electrode active material including the lithium metal composite oxide may be particularly increased. Also, by adjusting the content ratio of Mo in the metal components other than Li of the lithium metal composite oxide to be less than or equal to 5.0 at %, degradation of the sphericality of the lithium metal composite oxide may be more reliably prevented.

The positive electrode active material according to the present embodiment contains dense secondary particles that are aggregations of a plurality of primary particles. The internal porosity of the dense secondary particles may be less than or equal to 3%, and the ratio of the number of such dense secondary particles (with respect to the total number of particles) may be greater than or equal to 65%.

The positive-electrode active material according to the present embodiment may include a lithium metal composite oxide formed by the solution of two types layered compounds represented by formulas $Li_2M1O_3$ and $LiM2O_2$, more specifically, a lithium-rich nickel-cobalt-manganese composite oxide. The positive-electrode active material according to the present embodiment may also consist of the above lithium metal composite oxide. In the above formulas, M1 denotes metal elements including at least Mn that are adjusted to be tetravalent on average, and M2 denotes metal elements including at least Ni, Co, and Mn that are adjusted to be trivalent on average.

It is assumed that the composition ratios of Ni, Co, and Mn in the precursor as described above determine the composition of M1+M2. Also, because the above lithium metal composite oxide is a lithium-rich metal composite oxide, the presence ratios of $Li_2M1O_3$ and $LiM2O_2$ are adjusted so that the presence ratio of $Li_2M1O_3$ is not 0%.

The positive electrode active material according to the present embodiment includes secondary particle having dense structures extending into their core. By arranging the secondary particles to have such a dense structure, the tap density of the positive electrode active material can be increased. Specifically, the positive electrode active material according to the present embodiment is preferably arranged to have a tap density that is greater than or equal to 1.9 g/cc and less than or equal to 2.0 g/cc.

The dense secondary particles contained in the positive electrode active material according to the present embodiment preferably has a porosity that is less than or equal to 3%. Also, the ratio of the number of such dense secondary particles with respect to the total number of particles contained in the positive electrode active material is preferably greater than or equal to 65%. Note that the porosity of the dense secondary particles may be obtained by observing a cross-sectional structure of the positive electrode active material using a scanning electron microscope (SEM) and calculating the porosity through image processing, for example. Also, the number ratio of the dense secondary particles may be obtained by observing cross-sectional structures of a plurality of (e.g., 100) secondary particles of the positive-electrode active material using a SEM, for example, and counting the number of secondary particles having dense structures.

[Method for Manufacturing Positive Electrode Active Material for Nonaqueous Electrolyte Secondary Battery]

In the following, an example method for manufacturing a positive electrode active material for a nonaqueous electrolyte secondary battery (hereinafter also simply referred to as "positive electrode active material manufacturing method") according to an embodiment of the present invention will be described.

Although the positive electrode active material manufacturing method according to the present embodiment is not particularly limited as long as a positive electrode active material having the above-described particle structure can be manufactured, the following method may preferably be used to reliably manufacture the positive electrode active material.

For example, the positive electrode active material manufacturing method according to the present embodiment may include the following steps.

A heat treatment step of heat-treating the positive electrode active material precursor for a nonaqueous electrolyte secondary battery obtained by the above-described method for manufacturing a positive-electrode active material precursor for a nonaqueous electrolyte secondary battery at a temperature greater than or equal to 80° C. and less than or equal to 600° C.

A mixing step of adding and mixing a lithium compound into the particles obtained by the heat treatment step to form a lithium mixture.

A firing step of firing the lithium mixture in an oxidizing atmosphere at a temperature greater than or equal to 600° C. and less than or equal to 1000° C.

In the following, each of the above steps will be described.

(1) Heat Treatment Step

In the heat treatment step, the above-described precursor may be heat-treated at a temperature greater than or equal to 80° C. and less than or equal to 600° C. By performing the heat treatment, moisture contained in the precursor can be removed, and variations in the ratios of the number of metal atoms and the number of lithium atoms in the positive-electrode active material to be ultimately obtained can be prevented.

Note that the moisture removal may be performed to the extent necessary to prevent variations in the ratios of the number of metal atoms and the number of lithium atoms in the positive-electrode active material. As such, it may not be necessary to convert all the precursor particles into nickel-cobalt-manganese composite oxide. However, in order to further reduce the variations in the atom number ratios, the heat treatment temperature is preferably arranged to be greater than or equal to 500° C., and all the precursor particles are preferably converted into composite oxide particles.

Note that the heat treatment temperature is arranged to be greater than or equal to 80° C. in the heat treatment step because excessive moisture in the precursor particles may not be adequately removed and variations in the atom number ratios may not be adequately prevented if the heat treatment temperature is lower than 80° C.

On the other hand, the heat treatment temperature is arranged to be less than or equal to 600° C. in the heat treatment step because particles may be sintered due to burning and composite oxide particles with uniform particle diameters may not be obtained if the heat treatment temperature is above 600° C. By determining the metal components contained in the precursor particles corresponding to the heat treatment conditions through analysis in advance and determining the ratio of the metal compounds to the lithium compound, the above-described variations may be prevented.

The heat treatment atmosphere is not particularly limited as long as the heat treatment is performed in a non-reducing atmosphere, but for example, the heat treatment step can be conveniently performed in an airflow.

Although the heat treatment time is not particularly limited, the heat treatment is preferably performed for at least 1 hour, and more preferably for at least 2 hours and no more than 15 hours. Note that if the heat treatment is performed for less than 1 hour, excessive moisture in the precursor particles may not be adequately removed.

The equipment used for the heat treatment is not particularly limited as long as the precursor particles can be heated in a non-reducing atmosphere, preferably in an airflow. For example, an electric furnace that does not generate gas may preferably be used.

(2) Mixing Step

In the mixing step, a lithium compound is added to and mixed with the heat-treated particles obtained by heating the precursor particles in the heat treatment step to form a lithium mixture.

Note that the heat-treated particles obtained by heating the precursor particles in the heat treatment step include nickel-cobalt-manganese carbonate composite particles and/or nickel-cobalt-manganese composite oxide particles.

The heat-treated particles and the lithium compound are preferably mixed together such that, provided Li/Me represents the ratio of the number of lithium atoms (Li) to the number of atoms constituting the metal components other than lithium in the lithium mixture, i.e., the total number of atoms of nickel, cobalt, manganese, and the additional element M (Me) in the lithium mixture, Li/Me is greater than or equal to 1.1 and less than or equal to 1.6. More preferably, the heat-treated particles and the lithium compound are mixed together such that the ratio Li/Me is greater than or equal to 1.25 and less than or equal to 1.55.

That is, because no change occurs in the ratio Li/Me before and after the firing step, the ratio Li/Me in the lithium mixture obtained in the mixing step becomes the ratio Li/Me in the positive-electrode active material. As such, the ratio Li/Me in the lithium mixture is adjusted to be substantially the same as the ratio Li/Me in the positive-electrode active material to be manufactured.

The lithium compound to be used for forming the lithium mixture is not particularly limited, but for example, at least one compound selected from a group consisting of lithium hydroxide, lithium nitrate, and lithium carbonate may be used in view of the accessibility the above compounds.

In particular, in consideration of ease of handling and quality stability, at least one compound selected from a group consisting of lithium hydroxide and lithium carbonate is preferably used as the lithium compound for forming the lithium mixture.

Note that a general mixer can be used to mix the lithium compound in the mixing step. For example, a shaker mixer, a Lödige mixer, a Julia mixer, a V blender, or the like may be used.

(3) Firing Step

The firing step is a step of firing the lithium mixture obtained in the mixing step to obtain a positive electrode active material. When the lithium mixture is fired in the firing step, lithium in the lithium compound diffuses into the heat treated particles so that a lithium-nickel-cobalt-manganese composite oxide is formed. The firing temperature of the lithium mixture is not particularly limited, but for example, the firing temperature is preferably greater than or equal to 600° C. and less than or equal to 1000° C.

By controlling the firing temperature to be greater than or equal to 600° C., diffusion of lithium into the heat-treated particles may be sufficiently promoted, excessive lithium and unreacted particles may be prevented from remaining in the positive electrode active material, and adequate battery characteristics may be obtained when the positive electrode active material is used in a battery.

However, when the firing temperature exceeds 1000° C., rampant sintering of the composite oxide particles and abnormal nucleus growth may occur such that the specific surface area of the positive electrode active material obtained by the firing may decrease. When such a positive electrode active material is used in a battery, the positive electrode resistance may increase and the battery capacity may decrease.

Note that from the perspective of promoting uniform reaction between the heat-treated particles and the lithium compound, the temperature is preferably raised to the above firing temperature at a temperature increase rate that is greater than or equal to 3° C./min and less than or equal to 10° C./min.

Further, by maintaining the temperature close to the melting point of the lithium compound for about 1 hour to 5 hours, a more uniform reaction can be promoted. In the case where the temperature is maintained close to the melting point of the lithium compound, the temperature can thereafter be raised to a predetermined firing temperature.

In the firing step, the firing temperature is preferably maintained for at least 2 hours, and more preferably for a time period greater than or equal to 4 hours and less than or equal to 24 hours.

By maintaining the firing temperature for at least 2 hours, formation of a lithium-nickel-cobalt-manganese composite oxide can be adequately promoted.

After maintaining the firing temperature for the above time period, although not particularly limited, in the case where the lithium mixture is loaded in a sagger in the firing step, the temperature is preferably decreased to be less than or equal to 200° C. at a decrease rate that is greater than or equal to 2° C./min and less than or equal to 10° C./min in order to prevent deterioration of the sagger.

The atmosphere during firing is preferably an oxidizing atmosphere, more preferably an atmosphere having an oxygen concentration that is greater than or equal to 18 vol % and less than or equal to 100 vol %, and more preferably a mixed-gas atmosphere including oxygen at the above oxygen concentration and an inert gas. That is, firing is preferably carried out in atmospheric air or in an oxygen-containing gas.

By controlling the oxygen concentration in the atmosphere during firing to be greater than or equal to 18 vol %, the crystallinity of the lithium-nickel-cobalt-manganese composite oxide may be adequately increased.

In particular, firing is preferably carried out in an oxygen airflow in consideration of battery characteristics.

Note that the furnace used in the firing step is not particularly limited as long as it is capable of heating the lithium mixture in atmospheric air or in an oxygen-containing gas. However, from the perspective of maintaining a uniform atmosphere within the furnace, an electric furnace that does not generate gas is preferably used. Also, note that either a batch type furnace or a continuous type furnace may be used.

Also, in the case where lithium hydroxide or lithium carbonate is used as the lithium compound, calcination is preferably performed after completing the mixing step, before performing the firing step. The calcination temperature is lower than the firing temperature, and is preferably greater than or equal to 350° C. and less than or equal to 800° C., and more preferably greater than or equal to 450° C. and less than or equal to 780° C.

The calcination is preferably performed for about 1 hour to 10 hours, and more preferably for about 3 hours to 6 hours.

Note that calcination is preferably performed by maintaining the temperature at the above calcination temperature. That is, calcination is preferably performed at the reaction temperature for the reaction between lithium hydroxide or lithium carbonate and the heat-treated particles.

By performing calcination in the above-described manner, lithium may be adequately diffused into the heat-treated particles, and a uniform lithium-nickel-cobalt-manganese composite oxide may be obtained.

Note that aggregation or a mild sintering of the lithium-nickel-cobalt-manganese composite oxide particles obtained by the firing step may occur in some cases.

In such case, the lithium-nickel-cobalt-manganese composite oxide particles may be disintegrated. In this way, the positive electrode active material including the lithium-nickel-cobalt-manganese composite oxide according to the present embodiment can be obtained.

Note that disintegration refers to a process of dissociating and separating secondary particles that have been aggregated while avoiding destruction of the secondary particles themselves by introducing mechanical energy to the aggregated secondary particles that have been formed by the necking (sintering) of the secondary particles in the firing step, for example.

[Nonaqueous Electrolyte Secondary Battery]

In the following, an example configuration of a nonaqueous electrolyte secondary battery according to an embodiment of the present invention will be described. The nonaqueous electrolyte secondary battery according to the present embodiment may have a positive electrode that uses the above-described positive-electrode active material.

First, the structure of the nonaqueous electrolyte secondary battery according to the present embodiment will be described below.

The nonaqueous electrolyte secondary battery according to the present embodiment (hereinafter also simply referred to as "secondary battery") may have a structure that is substantially identical to that of a general nonaqueous electrolyte secondary battery except that the above-described positive-electrode active material is used as the positive electrode material for its positive electrode.

For example, the secondary battery according to the present embodiment may include a case having a positive electrode, a negative electrode, a nonaqueous electrolyte, and a separator accommodated therein.

More specifically, the secondary battery according to the present embodiment may include an electrode body that is configured by stacking a positive electrode and a negative electrode via a separator. The electrode body may be impregnated with the nonaqueous electrolyte. A positive electrode current collector of the positive electrode may be connected to a positive electrode terminal communicating with the outside using a current collection lead, for example, and a negative electrode current collector of the negative electrode may be connected to a negative electrode terminal communicating with the outside using a current collection lead, for example. The electrode body having such a structure may be sealed within the case.

Note that the structure of the secondary battery according to the present embodiment is not limited to the above example. Also, the secondary battery can be in various formats, such as the cylinder format or the laminated format, for example.

(Positive Electrode)

In the following, the positive electrode of the secondary battery according to the present embodiment will be described. The positive electrode is a sheet member and is formed by coating and drying a positive electrode mixed material paste containing the above-described positive electrode active material on the surface of a current collector made of aluminum foil, for example.

Note that the positive electrode is appropriately treated according to the specific battery in which the positive electrode is used. For example, a cutting process may be performed to form the positive electrode into an appropriate size for a target battery, and a pressure compression process such as a roll press may be performed to increase the electrode density.

The positive electrode mixed material paste may be formed by adding a solvent to a positive electrode mixed material and kneading the positive electrode mixed material. The positive electrode mixed material may be formed by mixing the above-described positive electrode active material that is in powder form with a conductive material and a binder.

The conductive material is added to give appropriate conductivity to the electrode. The conductive material is not particularly limited, but for example, graphite (natural graphite, artificial graphite, expanded graphite, etc.) or carbon black material, such as acetylene black or ketjen black, may be used.

The binder is for binding together the positive electrode active material particles. The binder used in the positive electrode mixed material is not particularly limited, but for example, polyvinylidene fluoride (PVDF), polytetrafluoroethylene (PTFE), fluororubber, ethylene propylene diene rubber, styrene butadiene, cellulose resin, polyacrylic acid, and the like may be used.

Note that activated carbon or the like may be added to the positive electrode mixed material, for example. By adding activated carbon or the like to the positive electrode mixed material, the electric double layer capacity of the positive electrode may be increased.

The solvent dissolves the binder and causes the positive electrode active material, the conductive material, the activated carbon, and the like to disperse in the binder. The solvent is not particularly limited, but for example, an organic solvent such as N-methyl-2-pyrrolidone may be used.

Note that the mixing ratio of each substance in the positive electrode mixed material paste is not particularly limited. For example, assuming the solid content of the positive electrode mixed material (i.e., components of the positive electrode mixed material paste other than the solvent) is 100 parts by mass, as in a positive electrode of a general nonaqueous electrolyte secondary battery, the content of the positive electrode active material may be adjusted to be greater than or equal to 60 parts by mass and less than or equal to 95 parts by mass, the content of the conductive material may be adjusted to be greater than or equal to 1 part by mass and less than or equal to 20 parts by mass, and the content of the binder may be adjusted to be greater than or equal to 1 part by mass and less than or equal to 20 parts by mass.

(Negative Electrode)

The negative electrode is a sheet member formed by applying a negative electrode mixed material paste on the surface of a metal foil current collector made of copper foil, for example, and drying the sheet member. Although the components of the negative electrode mixed material paste, the mix ratio thereof, and the material of the current collector may be different from the positive electrode, the negative electrode may be formed in substantially the same manner as the positive electrode. Also, as with the positive electrode, the negative electrode may be subjected to various treatments according to the target battery.

The negative electrode mixed material paste is a paste prepared by adding a suitable solvent to a negative electrode mixed material obtained by mixing together a negative-electrode active material and a binder.

The negative electrode active material may be a material containing lithium, such as metallic lithium or a lithium alloy, or an insertion material capable of sustaining insertion and deinsertion of lithium ions, for example.

The insertion material is not particularly limited, but for example, an organic compound fired body, such as natural graphite, artificial graphite, or a phenolic resin, or a powder of a carbon substance such as coke (petroleum coke) may be used. When such a material is used as the negative electrode active material, as with the positive electrode, a fluorine-containing resin such as PVDF may be used as the binder, and an organic solvent such as N-methyl-2-pyrrolidone may be used as the solvent for dispersing the negative electrode active material in the binder.

(Separator)

The separator is interposed between the positive electrode and the negative electrode and has a function of separating the positive electrode and the negative electrode and holding the electrolyte. Such a separator may be a thin film of polyethylene or polypropylene having a large number of fine pores, for example. However, the separator is not particularly limited as long as it has the above function.

(Nonaqueous Electrolyte)

The nonaqueous electrolyte is obtained by dissolving a lithium salt as a supporting salt in an organic solvent.

Examples of the organic solvent include cyclic carbonates, such as ethylene carbonate, propylene carbonate, butylene carbonate, and trifluoropropylene carbonate; chain carbonates, such as diethyl carbonate, dimethyl carbonate, ethylmethyl carbonate, and dipropyl carbonate; ether compounds, such as tetrahydrofuran, 2-methyltetrahydrofuran, and dimethoxyethane; a sulfur compound, such as ethylmethylsulfone and butane sultone; phosphorus compounds, such as triethyl phosphate and trioctyl phosphate. These substances may be used alone or in combination as the organic solvent.

Examples of the supporting salt include $LiPF_6$, $LiBF_4$, $LiClO_4$, $LiAsF_6$, $LiN(CF_3SO_2)_2$, complex salts thereof.

The nonaqueous electrolyte may also contain a radical scavenger, a surfactant, a flame retardant, and the like in order to improve battery characteristics.

(Characteristics of Nonaqueous Electrolyte Secondary Battery According to Present Embodiment)

The nonaqueous electrolyte secondary battery according to the present embodiment may have the above-described structure, for example. Because the nonaqueous electrolyte secondary battery according to the present embodiment has a positive electrode that is formed using the above-described positive electrode active material, high initial discharge capacity and low positive electrode resistance may be obtained to thereby achieve high capacity and high output.

(Application of Secondary Battery According to Present Embodiment)

In view of the above-described characteristics, the secondary battery according to the present embodiment may be suitably used as a power source of a small portable electronic device (notebook personal computer, mobile phone terminal, etc.) that requires high capacity.

Also, the secondary battery according to the present embodiment may be suitably used as a motor driving power source that requires high output. When the size of a battery is increased, it becomes difficult to ensure safety such that an expensive protection circuit becomes indispensable. However, the secondary battery according to the present embodiment has excellent safety, and as a result, safety can be easily ensured, a protection circuit can be simplified, and manufacturing costs can be reduced. Because the secondary battery according to the present embodiment can be reduced in size and have increased output power, it can be suitably used as a power source for transportation equipment having restricted mounting space, for example.

EXAMPLES

In the following, the present invention will be described more specifically with reference to examples. However, the present invention is not limited to the following examples.

Sample preparation conditions and sample evaluation results of each example and comparative example are described below.

Example 1

1. Precursor Manufacture and Evaluation

First, a precursor was prepared by the following procedure.

Note that in all the examples and comparative examples described below, unless otherwise specified, reagent special grade samples manufactured by Wako Pure Chemical Industries, Ltd. were used to manufacture precursors, positive-electrode active materials and secondary batteries.

(Nucleation Step)

(1) Initial Aqueous Solution Preparation

First, a reaction tank (5 L) was filled with about 1.2 L of water, and while stirring the water, the temperature inside the reaction tank (5 L) was set to 40° C. so that the temperatures of mixed aqueous solutions in a nucleation step, a nuclei disintegration step, and a nucleus growth step as described below would be controlled to 40° C. Note that the temperatures of the initial aqueous solution and the mixed aqueous solutions were controlled by adjusting the temperature of reaction tank heating water arranged around the reaction tank.

Then, an appropriate amount of 25 mass % ammonia water was added to the water in the reaction tank, and the ammonium ion concentration in the initial aqueous solution was adjusted to 5 g/L.

Further, 64% sulfuric acid was added to the initial aqueous solution to adjust the pH to 6.4.

Then, nitrogen gas was supplied at 5 L/min from a nitrogen gas cylinder, and the interior of the reaction tank was purged to obtain an nitrogen atmosphere. Note that the nitrogen atmosphere in the reaction tank was maintained until completion of the nucleus growth step.

(2) Metal Component-Containing Mixed Aqueous Solution Preparation

Next, nickel sulfate, cobalt sulfate, and manganese sulfate were dissolved in water to prepare a metal component-containing mixed aqueous solution with a metal ion concentration of 2.0 mol/L. In this metal component-containing mixed aqueous solution, the molar ratio of the respective metal elements was adjusted so that Ni:Co:Mn=0.165:0.165:0.67.

(3) pH Adjustment Aqueous Solution Preparation

Sodium carbonate and ammonium carbonate were dissolved in water to prepare a pH adjustment aqueous solution with a carbonate ion concentration of 2.2 mol/L. Note that the sodium carbonate and the ammonium carbonate were added to the pH adjustment aqueous solution such that the molar ratio the sodium carbonate to the ammonium carbonate would be 9:2.

(4) Adding and Mixing Metal Component-Containing Mixed Aqueous Solution to Initial Aqueous Solution The metal component-containing mixed aqueous solution was added to the initial aqueous solution in the reaction tank at 10.3 ml/min to prepare a mixed aqueous solution.

Note that when adding the metal component-containing mixed aqueous solution, the pH adjustment aqueous solution was also added at the same time, and the nucleation step was carried out by promoting crystallization for four minutes while controlling the pH value (reaction temperature 40° C. standard) of the mixed aqueous solution in the reaction tank to be 6.4 (set pH value).

In the nucleation step, the pH value of the mixed aqueous solution was controlled by adjusting the supply flow rate of the pH adjustment aqueous solution using a pH controller. The fluctuation range of the pH value of the mixed aqueous solution was maintained within 0.2 above or below set pH value.

(5) Disintegration Step

After adding the metal component-containing mixed aqueous solution and the pH adjustment aqueous solution, stirring was continued for 5 minutes to disintegrate the nuclei.

(Nucleus Growth Step)

In the nucleus growth step, the same metal component-containing mixed aqueous solution and the pH adjustment aqueous solution used in the nucleation step were used. The experimental procedure of the nucleus growth step will be described below.

(1) pH Adjustment of Mixed Aqueous Solution

In the nucleus growth step, first, the pH adjustment aqueous solution was added to the mixed aqueous solution obtained in the nucleation step to adjust the pH value to 7.4 (liquid temperature of 40° C. standard).

(2) Adding and Mixing Metal Component-Containing Mixed Aqueous Solution into Mixed Aqueous Solution The metal component-containing mixed aqueous solution was added to the pH-adjusted mixed aqueous solution at a rate of 10.3 ml/min.

At this time, the amount of the metal component-containing mixed aqueous solution and the amount of the pH adjustment aqueous solution added to the mixed aqueous solution were controlled so that the pH value of the mixed aqueous solution would be 7.4 (set pH value) at a reaction temperature of 40° C. as the standard temperature.

After maintaining the above processing condition for 196 minutes, stirring was stopped and crystallization was terminated.

Then, the product obtained in the nucleus growth step was washed with water, filtered, and dried to obtain precursor particles (washing and drying step).

Note that in the nucleus growth step, the pH value of the mixed aqueous solution was controlled by adjusting the supply flow rate of the pH adjustment aqueous solution using a pH controller, and the fluctuation range of the pH value of the mixed aqueous solution was maintained within 0.2 above or below the set pH value.

Also, in the nucleation step and the nucleus growth step, the ammonium ion concentration in the mixed aqueous solution was maintained at 5 g/L.

(Precursor Evaluation)

After dissolving the obtained precursor in an inorganic acid and subjecting the resulting sample to chemical analysis by ICP emission spectroscopy, it was confirmed that the sample was a carbonate with the composition Ni:Co:Mn=16.0 at %:16.8 at %:67.2 at %. Further, by measuring the elemental amount of hydrogen (H) in the sample using an element analyzer (FlashEA 1112 manufactured by Thermo Fisher Scientific) to calculate the mass ratio of hydrogen (H) to metal (Ni+Co+Mn), it was confirmed that the mass ratio was 1.45. Also, it was confirmed that the sample includes a hydrogen-containing functional group.

Further, the average particle diameter $d_{50}$ of the precursor particles was measured using a laser diffraction/scattering type particle size distribution measuring apparatus (Microtrack HRA manufactured by Nikkiso Co., Ltd.), and as a result, it was confirmed that the average particle diameter of the precursor particles was 9.2 μm.

Also, the laser diffraction/scattering type particle size distribution measuring apparatus was similarly used to measure diameters $d_{90}$ and $d_{10}$ of the precursor particles, and the measurement results were used to calculate the index $[(d_{90}-d_{10})/$average particle diameter] indicating the particle size distribution range. As a result, the index $[(d_{90}-d_{10})/$average particle diameter] was determined to be 0.51.

Then, observations were made on the obtained precursor particles using SEM (Scanning Electron Microscope S-4700 manufactured by Hitachi High-Technologies Corporation) (magnification: 1000×), and it was confirmed that the obtained precursor particles contained secondary particles formed by aggregations of a plurality of primary particles that were substantially spherical and were uniform in particle diameter. Note that in Table 2 shown below, an evaluation result of the "precursor particle sphericality" is indicated as "○" for precursors that were observed to have particles in such shape.

2. Positive Electrode Active Material Manufacture and Evaluation

Next, the obtained precursor was used to manufacture a positive electrode active material, which was then evaluated.

(Positive Electrode Active Material Manufacture)

The precursor was heat-treated at 500° C. for 2 hours in an airflow (oxygen: 21% by volume) and converted into composite oxide particles as heat-treated particles, which were then collected.

Next, the heat-treated particles and a lithium compound were mixed together to obtain a lithium mixture.

Specifically, lithium carbonate was weighed so that the ratio Li/Me of the lithium mixture to be obtained would be 1.5, and the lithium carbonate was mixed with the heat-treated particles to prepare the lithium mixture.

The mixing was carried out using a shaker mixer device (TURBULA Type T2C manufactured by Willy A. Bachofen (WAB)).

The obtained lithium mixture was calcined at 500° C. for 5 hours in the atmosphere (oxygen: 21% by volume), fired at 800° C. for 2 hours, cooled, and then disintegrated to obtain a positive electrode active material.

Note that the composition of the obtained positive electrode active material can be expressed as $Li_{1.5}N_{0.149}Co_{0.167}Mn_{0.684}O_2$.

(Positive Electrode Active Material Evaluation)

The particle size distribution of the obtained positive electrode active material was measured using the same method as that used for measuring the precursor particles as described above, and as a result, it was confirmed that the average particle diameter of the obtained positive electrode active material was 8.5 μm.

Also, cross-sectional SEM observation of the positive electrode active material was performed.

In the cross-sectional SEM observation of the positive electrode active material, secondary particles constituting a plurality of positive electrode active material particles were embedded in resin, the resulting sample was polished using a cross-section polisher to enable cross-sectional observation of the particles, and the sample was then observed by SEM.

Figure 2A:
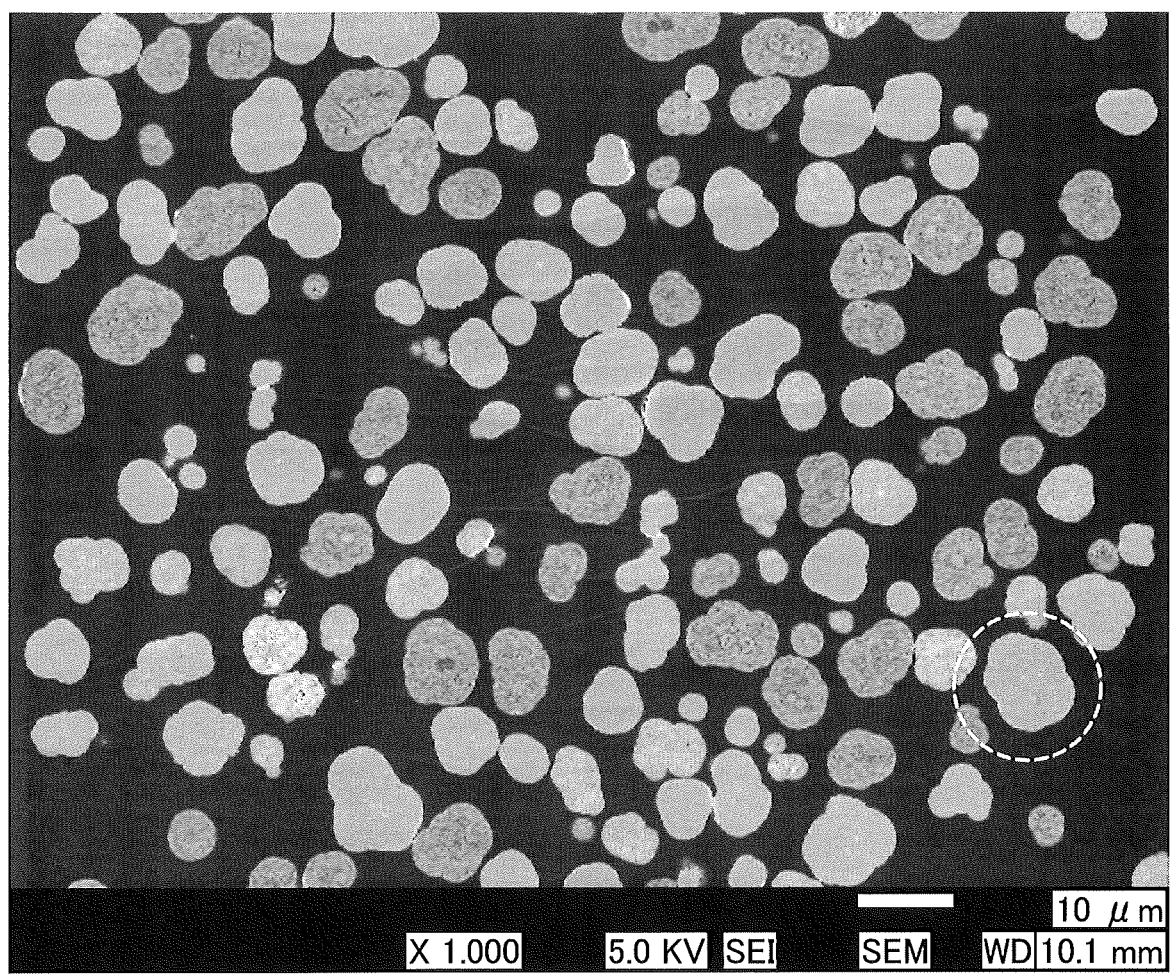
FIG. 2A is a cross-sectional SEM image of a positive electrode active material obtained in Example 1 of the present invention.
Figure 2B:
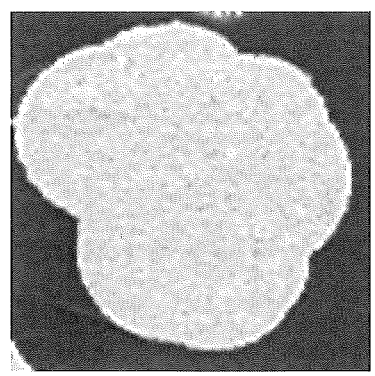
FIG. 2B is a partially enlarged view of FIG. 2A.

FIGS. 2A and 2B show cross-sectional SEM images of the positive electrode active material. FIG. 2A is an overall view, and FIG. 2B is a partial enlarged view of a particle encircled by a dashed line in the SEM image of FIG. 2A.

As can be appreciated from FIGS. 2A and 2B, the particles of the obtained positive electrode active material were substantially spherical. Note that in such case, an evaluation result of the "sphericality" of the positive electrode active material is indicated as "○" in Table 3. Also, it was confirmed that the secondary particles were dense particles.

Also, by observing 100 or more particles in these sectional SEM images, it was confirmed that the ratio of the number of dense particles with respect to the total number of particles was 69%. Also, the porosity of the dense particles was measured using image analysis software was 22%.

Further, measurement of the tap density confirmed that the obtained positive electrode active material had a tap density of 2.0 g/cc.

The tap density was measured after filling the obtained positive electrode active material in a 20-ml graduated cylinder and densely packing the positive electrode active material in the cylinder by repeatedly causing the cylinder to free-fall (drop) 500 times from a height of 2 cm.

Also, by measuring the specific surface area of the positive electrode active material using a flow type gas adsorption specific surface area measuring apparatus (Multisorb manufactured by Yuasa Ionics Inc.), it was confirmed that the specific surface area of the positive electrode active material was 3.7 m$^2$/g.

[Secondary Battery Manufacture]

The obtained positive electrode active material was used to manufacture a 2032-type coin battery, which was then evaluated.

Figure 3:
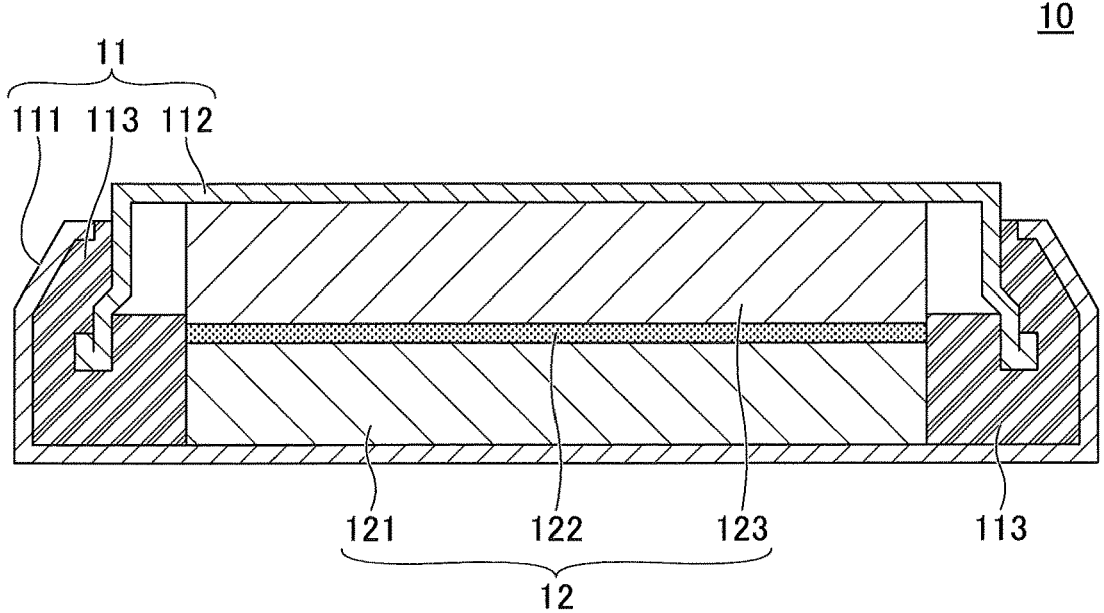
FIG. 3 is a cross-sectional view of a secondary battery manufactured in examples of the present invention and comparative examples.

The configuration of the manufactured coin battery will be described below with reference to FIG. 3. FIG. 3 schematically shows a cross-sectional configuration of a coin battery 10.

As shown in FIG. 3, the coin battery 10 includes a case 11 and an electrode 12 that is accommodated in the case 11.

The case 11 includes a positive electrode can 111 that is hollow and has an opening at one end and a negative electrode can 112 that is arranged in the opening of the positive electrode can 111. The negative electrode can 112 is arranged in the opening of the positive electrode can 111 such that a space for accommodating the electrode 12 is formed between the negative electrode can 112 and the positive electrode can 111.

The electrode 12 includes a positive electrode 121, a separator 122, and a negative electrode 123 that are stacked in above recited order. The electrode 12 is accommodated inside the case 11 such that the positive electrode 121 comes into contact with the inner surface of the positive electrode can 111 and the negative electrode 123 comes into contact with the inner surface of the negative electrode can 112.

The case 11 also includes a gasket 113 that is fixed between the positive electrode can 111 and the negative electrode can 112 so that electrical insulation may be maintained between the positive electrode can 111 and the negative electrode can 112. Also, the gasket 113 has a function of sealing the gap between the positive electrode can 111 and the negative electrode can 112 and keeping the interior of the case 11 airtight and liquid-tight from the outside.

The coin battery 10 was manufactured in the following manner. First, 52.5 mg of the obtained positive electrode active material, 15 mg of acetylene black and 7.5 mg of polytetrafluoroethylene resin (PTFE) were mixed together with a solvent (N-methyl-2-pyrrolidone), and the mixed material was press-molded at a pressure of 100 MPa into a disk shape with a diameter of 11 mm and a thickness of 100 μm to manufacture the positive electrode 121. The manufactured positive electrode 121 was dried in a vacuum dryer at 120° C. for 12 hours. Using the positive electrode 121, the negative electrode 123, the separator 122, and an electrolytic solution, the coin battery 10 was manufactured in a glove box with an Ar atmosphere that was controlled to a dew point of −80° C.

Note that as the negative electrode 123, a negative electrode sheet stamped out into a disk shape with a diameter of 14 mm and famed by coating graphite powder with an average particle diameter of about 20 μm and polyvinylidene fluoride on a copper foil was used. As the separator 122, a porous polyethylene film having a thickness of 25 μm was used. As the electrolytic solution, an equal amount mixed solution of ethylene carbonate (EC) and diethyl carbonate (DEC) using 1 M of $LiClO_4$ as a supporting electrolyte (manufactured by Toyama Pharmaceutical Industry Co., Ltd.) was used.

[Battery Evaluation]

The initial discharge capacity for evaluating the performance of the obtained coin battery 10 is defined as follows.

The initial discharge capacity is defined as the capacity of the coin battery 10 measured after the following procedures have been implemented: leaving the coin battery 10 for about 24 hours after its manufacture to stabilize the open circuit voltage OCV (open circuit voltage), charging the coin battery 10 up to a cutoff voltage of 4.65 V while setting the current density with respect to the positive electrode to 0.05

C (270 mA/g is set to 1 C), pausing for 1 hour, and then discharging the coin battery 10 to a cut-off voltage of 2.35 V.

Upon performing battery evaluation of the coin battery having a positive electrode manufactured using the positive electrode active material according to the present embodiment, it was confirmed that the coin battery had an initial discharge capacity of 282 mAh/g.

Table 1 shows the manufacturing conditions of the present example, Table 2 shows the characteristics of the precursor obtained in the present example, and Table 3 shows the characteristics of the positive electrode active material obtained in the present example and the initial discharge capacity of the coin battery manufactured using the obtained positive electrode active material. Note that the above tables also show the same information for each of the examples and comparative examples described below.

Example 2

To add molybdenum as an additional element in the nucleation step and the nucleus growth step, an ammonium molybdate solution was added to the metal component-containing mixed aqueous solution.

Ammonium molybdate was added to and mixed with the metal component-containing mixed aqueous solution such that the content ratio of Mo in the transition metal components Ni, Co, Mn and Mo of the metal component-containing mixed aqueous solution would be 1.0 at %. Note that the elemental molar ratio of the metal elements other than Mo in the metal component-containing mixed aqueous solution, i.e., Ni, Co, and Mn, was adjusted to be the same as that in Example 1. That is, the elemental molar ratio of Ni, Co, and Mn in the metal component-containing mixed aqueous solution was adjusted to be Ni:Co:Mn=0.165:0.165:0.67.

Aside from using the above-described metal component-containing mixed aqueous solution, a precursor, a positive electrode active material, and a secondary battery were manufactured and evaluated in the same manner as in Example 1. The resulting characteristics of the obtained precursor, positive electrode active material, and secondary battery are shown in Tables 1 to 3. Note that the composition of the obtained positive electrode active material can be expressed as $Li_{1.5}Ni_{0.157}Co_{0.167}Mn_{0.666}Mo_{0.01}O_2$.

Example 3

A precursor, a positive electrode active material, and a secondary battery were manufactured and evaluated in the same manner as in Example 2 except that ammonium molybdate was added to and mixed with the metal component-containing mixed aqueous such that the content ratio of Mo in the transition metal components Ni, Co, Mn, and Mo of the metal component-containing mixed aqueous solution would be 3.0 at %. Note that as in Example 2, the elemental molar ratio of the metal elements other than Mo in the metal component-containing mixed aqueous solution, i.e., Ni, Co, and Mn, was adjusted to be Ni:Co:Mn=0.165:0.165:0.67.

The resulting characteristics of the obtained precursor, positive electrode active material, and secondary batter are shown in Tables 1-3.

The composition of the obtained positive electrode active material can be expressed as $Li_{1.5}Ni_{0.152}Co_{0.161}Mn_{0.657}Mo_{0.03}O_2$.

Example 4

A precursor, a positive electrode active material, and a secondary battery were manufactured and evaluated in the same manner as in Example 2 except that ammonium molybdate was added to and mixed with the metal component-containing mixed aqueous such that the content ratio of Mo in the transition metal components Ni, Co, Mn, and Mo of the metal component-containing mixed aqueous solution would be 5.0 at %. Note that as in Example 2, the elemental molar ratio of the metal elements other than Mo in the metal component-containing mixed aqueous solution, i.e., Ni, Co, and Mn, was adjusted to be Ni:Co:Mn=0.165:0.165:0.67.

The resulting characteristics of the obtained precursor, positive electrode active material, and secondary batter are shown in Tables 1-3.

The composition of the obtained positive electrode active material can be expressed as $Li_{1.5}Ni_{0.148}Co_{0.158}Mn_{0.644}Mo_{0.05}O_2$.

Example 5

A precursor, a positive electrode active material, and a secondary battery were manufactured and evaluated in the same manner as in Example 2 except that ammonium molybdate was added to and mixed with the metal component-containing mixed aqueous solution such that the content ratio of Mo in the transition metal components Ni, Co, Mn, and Mo of the metal component-containing mixed aqueous solution would be 0.5 at %. Note that as in Example 2, the elemental molar ratio of the metal elements other than Mo in the metal component-containing mixed aqueous solution, i.e., Ni, Co, and Mn, was adjusted to be Ni:Co:Mn=0.165:0.165:0.67.

The resulting characteristics of the obtained precursor, positive electrode active material, and secondary batter are shown in Tables 1-3.

The composition of the obtained positive electrode active material can be expressed as $Li_{1.5}Ni_{0.159}Co_{0.167}Mn_{0.669}Mo_{0.005}O_2$.

Example 6

A precursor, a positive electrode active material, and a secondary battery were manufactured and evaluated in the same manner as in Example 2 except that ammonium molybdate was added to and mixed with the metal component-containing mixed aqueous such that the content ratio of Mo in the transition metal components Ni, Co, Mn, and Mo of the metal component-containing mixed aqueous solution would be 6.0 at %. Note that as in Example 2, the elemental molar ratio of the metal elements other than Mo in the metal component-containing mixed aqueous solution, i.e., Ni, Co, and Mn, was adjusted to be Ni:Co:Mn=0.165:0.165:0.67.

The resulting characteristics of the obtained precursor, positive electrode active material, and secondary batter are shown in Tables 1-3.

Upon performing SEM observation of the obtained precursor and positive electrode active material in the same manner as in Example 1, it was observed that the sphericality of the precursor and the positive electrode active material obtained in the present example was slightly degraded as compared with the other examples. As such, the sphericality evaluations for the precursor and the positive electrode active material obtained in the present example are indicated as "X" in Tables 2 and 3.

The composition of the obtained positive electrode active material can be expressed as $Li_{1.5}Ni_{0.145}Co_{0.154}Mn_{0.641}Mo_{0.06}O_2$.

Comparative Example

A precursor, a positive electrode active material, and a secondary battery were manufactured and evaluated in the same manner as in Example 1 except that in the nucleation step, the pH value of the mixed aqueous solution was adjusted to be 8.0 at a reaction temperature of 40° C. as the standard temperature. The resulting characteristics of the obtained precursor, positive-electrode active material, and secondary battery are shown in Tables 1-3.

Cross-sectional SEM observation of the obtained positive electrode active material was performed in the same manner as in Example 1.

Figure 4A:
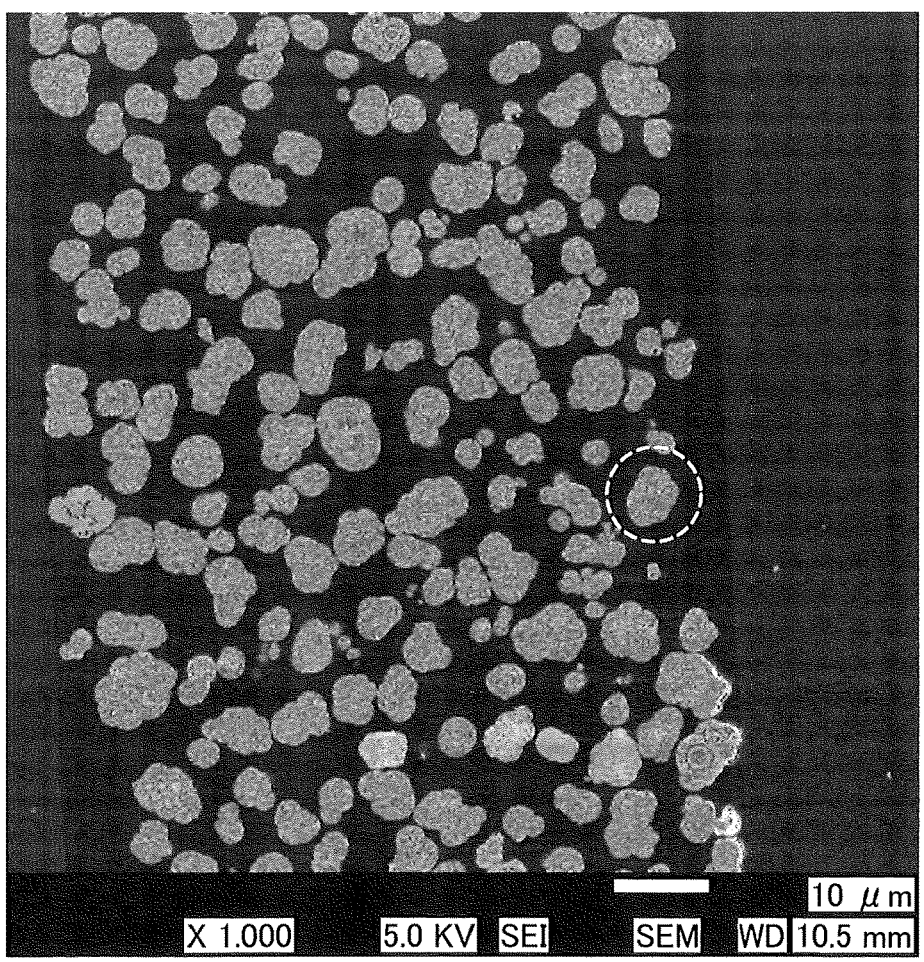
FIG. 4A is a cross-sectional SEM image of a positive electrode active material obtained in Comparative Example 1.
Figure 4B:
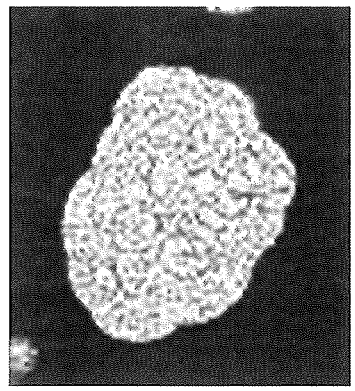
FIG. 4B is a partially enlarged view of FIG. 4A.

FIGS. 4A and 4B are cross-sectional SEM images of the positive electrode active material obtained in the present comparative example. FIG. 4B is an enlarged view of the particle encircled by a dashed line in the SEM image of FIG. 4A.

As can be appreciated from FIGS. 4A and 4B, the obtained positive electrode active material were porous particles; that is, dense particles could not be obtained in the present comparative example. Thus, as shown in Table 2, the tap density of the obtained positive electrode active material was degraded as compared with the other examples.

TABLE 1

| | PRECURSOR MANUFACTURING STEP | | | | | | POSITIVE ELECTRODE ACTIVE MATERIAL MANUFACTURING STEP | | |
|---|---|---|---|---|---|---|---|---|---|
| | NUCLEATION STEP | | | | NUCLEUS GROWTH STEP | | | | |
| | MIXED AQUEOUS SOLUTION TEMPERATURE (° C.) | MIXED AQUEOUS SOLUTION AMMONIUM ION CONCENTRATION (g/L) | MIXED AQUEOUS SOLUTION pH | TIME (min) | MIXED AQUEOUS SOLUTION AMMONIUM ION CONCENTRATION (g/L) | MIXED AQUEOUS SOLUTION pH | HEAT TREATMENT TEMPERATURE (° C.) | Li/Me IN LITHIUM MIXTURE | FIRING TEMPERATURE (° C.) |
| EXAMPLES 1-6 | 40 | 5 | 6.4 | 196 | 5 | 7.4 | 500 | 1.5 | 800 |
| COMPARATIVE EXAMPLE 1 | 40 | 5 | 8.0 | 196 | 5 | 7.4 | 500 | 1.5 | 800 |

TABLE 2

| | PRECURSOR COMPOSITION (at %) | | | | | PRECURSOR PARTICLE SPHERICALITY | PRECURSOR SECONDARY PARTICLE AVERAGE DIAMETER (μm) | $(d_{90}\text{-}d_{10})$/ AVERAGE PARTICLE DIAMETER |
|---|---|---|---|---|---|---|---|---|
| | Ni at % | Co at % | Mn at % | Mo at % | H/Me | | | |
| EXAMPLE 1 | 16.0 | 16.8 | 67.2 | 0.0 | 1.45 | ○ | 9.2 | 0.51 |
| EXAMPLE 2 | 15.7 | 16.7 | 66.6 | 1.0 | 1.48 | ○ | 9.1 | 0.50 |
| EXAMPLE 3 | 15.2 | 16.1 | 65.7 | 3.0 | 1.47 | ○ | 8.8 | 0.53 |
| EXAMPLE 4 | 14.8 | 15.8 | 64.4 | 5.0 | 1.52 | ○ | 8.7 | 0.53 |
| EXAMPLE 5 | 15.9 | 16.7 | 66.9 | 0.5 | 1.48 | ○ | 9.0 | 0.50 |
| EXAMPLE 6 | 14.5 | 15.4 | 64.1 | 6.0 | 1.50 | x | 8.5 | 0.52 |
| COMPARATIVE EXAMPLE 1 | 14.9 | 16.7 | 68.4 | 0.0 | 1.69 | ○ | 10.3 | 0.53 |

TABLE 3

| | AVERAGE PARTICLE DIAMETER (μm) | SPHERICALITY | DENSE PARTICLE NUMBER RATIO (%) | DENSE PARTICLE POROSITY (%) | TAP DENSITY (g/cc) | SPECIFIC SURFACE AREA (m²/g) | INITIAL DISCHARGE CAPACITY (mAh/g) | ENERGY DENSITY (TAP DENSITY × INITIAL DISCHARGE CAPACITY) (mAh/cc) |
|---|---|---|---|---|---|---|---|---|
| EXAMPLE 1 | 8.5 | ○ | 69 | 3 | 2.0 | 3.7 | 208 | 416 |
| EXAMPLE 2 | 8.5 | ○ | 75 | 3 | 2.2 | 2.1 | 233 | 513 |
| EXAMPLE 3 | 7.2 | ○ | 72 | 3 | 2.2 | 2.3 | 221 | 486 |
| EXAMPLE 4 | 6.2 | ○ | 70 | 3 | 2.1 | 2.8 | 227 | 477 |
| EXAMPLE 5 | 6.5 | ○ | 72 | 2 | 2.2 | 2.4 | 224 | 493 |
| EXAMPLE 6 | 4.0 | x | 68 | 3 | 2.1 | 3.4 | 222 | 466 |
| COMPARATIVE EXAMPLE 1 | 7.0 | ○ | 0 | — | 1.8 | 12.4 | 219 | 394 |

It can be appreciated from Table 2 that carbonate salts with the target compositions could be obtained as precursors in Examples 1-6. Also, it was confirmed that each of the precursors obtained in the above examples contained a hydrogen containing functional group. Further, it was confirmed that each of the precursors obtained in the above examples contained secondary particles formed by the aggregation of a plurality of primary particles.

Also, it can be appreciated from Table 3 that the positive electrode active materials manufactured from the precursors obtained in Examples 1-6 contained secondary particles formed by the aggregation of a plurality of primary particles, where dense particles constituted a large proportion of the secondary particles, and the dense particles had a low porosity. Thus, it can be confirmed that positive electrode active materials with high density and precursors thereof were formed in Examples 1-6.

Further, it can be appreciated from Table 3 that in each of Examples 1-6, the energy density calculated from the tap density and the initial discharge capacity was higher than that of Comparative Example 1.

Although the positive electrode active material precursor for a nonaqueous electrolyte secondary battery, the positive-electrode active material for a nonaqueous electrolyte secondary battery, the method for manufacturing a positive-electrode active material precursor for a nonaqueous electrolyte secondary battery, and the method for manufacturing a positive-electrode active material for a nonaqueous electrolyte secondary battery according to the present invention have been described above with respect to certain illustrative embodiments and examples, the present invention is not limited to the above-described embodiments and examples. It will be apparent to those skilled in the art that various modifications and changes can be made without departing from the scope of present invention.

The present application is based on and claims the benefit of priority of Japanese Patent Application No. 2016-001359 filed on Jan. 6, 2016 and Japanese Patent Application No. 2016-186239 filed on Sep. 23, 2016, the entire contents of which are herein incorporated by reference.

The invention claimed is:

1. A positive electrode active material for a nonaqueous electrolyte secondary battery, the positive electrode active material comprising:
    a lithium metal composite oxide represented by general formula $Li_{1+\alpha}Ni_xCo_yMn_zM_tO_2$ (where $0.25 \leq \alpha \leq 0.55$, $x+y+z+t=1$, $0.05 \leq x \leq 0.3$, $0.1 \leq y \leq 0.4$, $0.55 \leq z \leq 0.8$, $0 \leq t \leq 0.1$, and M denotes at least one additional element selected from a group consisting of Mg, Ca, Al, Ti, V, Cr, Zr, Nb, Mo, and W);
    wherein the lithium metal composite oxide includes a dense secondary particle formed by a plurality of primary particles that have been aggregated;
    wherein an internal porosity of the dense secondary particle is less than or equal to 3%, and a ratio of the number of the dense secondary particles, whose internal porosity is less than or equal to 3%, with respect to a total number of particles included in the positive electrode active material is greater than or equal to 65%,
    wherein the lithium metal composite oxide is composed of two types layered compounds represented by formulas $Li_2M1O_3$ and $LiM2O_2$ where M1 denotes at least one metal element including Mn and adjusted to be tetravalent on average, and M2 denotes metal elements including at least Ni, Co, and Mn that are adjusted to be trivalent on average,
    wherein a tap density of the positive electrode active material is greater than or equal to 1.9 g/cc, and
    wherein a specific surface area of the positive electrode active material is greater than or equal to 2.1 m$^2$/g and less than or equal to 3.7 m$^2$/g.

2. The positive electrode active material for a nonaqueous electrolyte secondary battery according to claim 1, wherein
    the additional element (M) in the general formula representing the lithium metal composite oxide includes molybdenum (Mo); and
    a content ratio of molybdenum (Mo) in metal components consisting of Ni, Co, Mn and the additional element M contained in the lithium metal composite oxide is greater than or equal to 0.5 at % and less than or equal to 5 at %.

3. The positive electrode active material for a nonaqueous electrolyte secondary battery according to claim 1, wherein
    the additional element (M) in the general formula is molybdenum (Mo); and
    $0.005 \leq t \leq 0.05$.

4. A positive-electrode active material manufacturing method for manufacturing the positive electrode active material for a nonaqueous electrolyte secondary battery according to claim 1, the positive-electrode active material manufacturing method comprising:
    a precursor manufacturing method for manufacturing a positive electrode active material precursor including a nickel-cobalt-manganese carbonate composite represented by general formula $Ni_xCo_yMn_zM_tCO_3$ (where $x+y+z+t=1$, $0.05 \leq x \leq 0.3$, $0.1 \leq y \leq 0.4$, $055 \leq z \leq 0.8$, $0 \leq t \leq 0.1$, and M denotes at least one additional element selected from a group consisting of Mg, Ca, Al, Ti, V, Cr, Zr, Nb, Mo, and W) and a hydrogen-containing functional group, the precursor manufacturing method comprising:
        a nucleation step of forming nuclei in a mixed aqueous solution that is prepared by mixing together, under the presence of carbonate ions, an initial aqueous solution containing an ammonium ion supplier, an aqueous solution containing nickel as a metal component, an aqueous solution containing cobalt as a metal component, and an aqueous solution containing manganese as a metal component; and
        a nucleus growth step of growing the nuclei formed in the nucleation step;
    wherein a pH value of the mixed aqueous solution is controlled to be less than or equal to 7.5 at a reaction temperature of 40° C. as a standard temperature in the nucleation step,
    wherein the positive-electrode active material manufacturing method further includes:
    a heat treatment step of heat-treating the positive electrode active material precursor that has been obtained by the precursor manufacturing method, the heat treatment being performed at a temperature greater than or equal to 80° C. and less than or equal to 600° C.;
    a mixing step of adding and mixing a lithium compound into particles obtained by the heat treatment step to form a lithium mixture; and a firing step of firing the lithium mixture in an oxidizing atmosphere at a temperature greater than or equal to 600° C. and less than or equal to 1000° C.

* * * * *